(12) United States Patent
Iyer et al.

(10) Patent No.: US 11,974,006 B2
(45) Date of Patent: *Apr. 30, 2024

(54) LIVE AND RECORDED CONTENT WATCH PARTIES

(71) Applicant: DISH Network Technologies India Private Limited, Bangalore (IN)

(72) Inventors: Satish Balasubramanian Iyer, M.S. Ramaiah (IN); Girish Pai Mangaldas, Karwar (IN); Mahesh Thatumparmbil Viswanathan, Nallurhalli (IN); Nishit Dabi, Bhopal (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,369

(22) Filed: Jan. 8, 2023

(65) Prior Publication Data

US 2023/0145338 A1    May 11, 2023

Related U.S. Application Data

(63) Continuation of application No. 17/087,815, filed on Nov. 3, 2020, now Pat. No. 11,606,597.

(30) Foreign Application Priority Data

Sep. 3, 2020    (IN) .............................. 202041037988

(51) Int. Cl.
*H04N 21/43*    (2011.01)
*H04N 21/2187*    (2011.01)
(Continued)

(52) U.S. Cl.
CPC ... *H04N 21/43076* (2020.08); *H04N 21/2187* (2013.01); *H04N 21/2387* (2013.01); *H04N 21/4852* (2013.01)

(58) Field of Classification Search
CPC ......... H04N 21/43076; H04N 21/2187; H04N 21/2387; H04N 21/4852
See application file for complete search history.

(56) References Cited

U.S. PATENT DOCUMENTS 6,081,830 A    6/2000 Schindler
6,237,025 B1    5/2001 Ludwig et al.
(Continued)

FOREIGN PATENT DOCUMENTS

CN    103290360 B    3/2016
CN    110430457 A    11/2019
(Continued)

OTHER PUBLICATIONS

U.S. Appl. No. 16/706,764, Prosecution Reopened, dated Jan. 4, 2023.
(Continued)

*Primary Examiner* — Kyu Chae
(74) *Attorney, Agent, or Firm* — Wash Park IP Ltd.; John T. Kennedy

(57) ABSTRACT

System and methods for facilitating content watch parties may include a sync server having a server CPU, a host user device, a client user device, and a content provider. The content provider may first provide a first portion of the content independently to the host user device and the client user device. The content provider may second provide a second portion of the content to the host user device and the client user device. The first providing of the first portion of the content may occur separately of the second providing of the second portion of the content. The sync server may synchronize the second providing of the second portion of the content to the client user device to facilitate substantially simultaneously presentations of the second portion of the content by the host user device and the client user device.

18 Claims, 7 Drawing Sheets

(51) Int. Cl.
  *H04N 21/2387*  (2011.01)
  *H04N 21/485*  (2011.01)

(56) References Cited

U.S. PATENT DOCUMENTS

| | | |
|---|---|---|
| 6,256,663 B1 | 7/2001 | Davis |
| 6,392,664 B1 | 5/2002 | White et al. |
| 6,519,771 B1 | 2/2003 | Zenith |
| 6,643,291 B1 | 11/2003 | Yoshihara et al. |
| 6,646,673 B2 | 11/2003 | Caviedes et al. |
| 6,754,904 B1 | 6/2004 | Cooper et al. |
| 7,143,428 B1 | 11/2006 | Bruck et al. |
| 8,015,306 B2 | 9/2011 | Bowman |
| 8,046,411 B2 | 10/2011 | Hayashi et al. |
| 8,223,185 B2 | 7/2012 | Gratton et al. |
| 8,316,400 B1 | 11/2012 | Kravets |
| 9,015,306 B2 | 4/2015 | Dupre et al. |
| 9,226,011 B2 | 12/2015 | Francisco |
| 9,252,950 B2 | 2/2016 | Caspi |
| 9,378,474 B1 | 6/2016 | Story, Jr. et al. |
| 9,471,809 B2 | 10/2016 | Garrett et al. |
| 9,544,624 B2 | 1/2017 | VanDuyn et al. |
| 9,654,817 B2 | 5/2017 | Li et al. |
| 10,135,887 B1 | 11/2018 | Esser et al. |
| 10,187,690 B1 | 1/2019 | Garcia et al. |
| 10,237,587 B2 | 3/2019 | Zanabria et al. |
| 10,536,741 B1 | 1/2020 | Madison et al. |
| 10,575,042 B2 | 2/2020 | Rennison et al. |
| 10,735,825 B1 | 8/2020 | Comito et al. |
| 10,757,366 B1 | 8/2020 | Kwatra et al. |
| 10,757,467 B1 | 8/2020 | Katz et al. |
| 10,762,474 B2 | 9/2020 | Frank et al. |
| 10,819,758 B1 | 10/2020 | Krutsch et al. |
| 10,939,148 B2 | 3/2021 | Sun |
| 11,019,113 B2 | 5/2021 | Kurata et al. |
| 11,051,059 B2 | 6/2021 | Dodson et al. |
| 11,082,467 B1 | 8/2021 | Hartnett et al. |
| 11,128,916 B2 | 9/2021 | Mayhew et al. |
| 11,166,065 B1 | 11/2021 | Camargo et al. |
| 11,303,947 B2 | 4/2022 | Bertolami et al. |
| 11,477,516 B2 | 10/2022 | Yoden |
| 11,502,864 B2 | 11/2022 | Moorefield et al. |
| 11,509,726 B2 | 11/2022 | Alsina et al. |
| 11,553,159 B1 | 1/2023 | Rothschild et al. |
| 11,588,869 B2 | 2/2023 | Gratton et al. |
| 11,606,597 B2 * | 3/2023 | Iyer .................... H04N 21/4788 |
| 11,762,917 B2 | 9/2023 | Frank et al. |
| 2002/0067909 A1 | 6/2002 | Iivonen |
| 2003/0009766 A1 | 1/2003 | Marolda |
| 2003/0097655 A1 | 5/2003 | Novak |
| 2003/0229900 A1 | 12/2003 | Reisman |
| 2004/0154040 A1 | 8/2004 | Ellis |
| 2004/0205811 A1 | 10/2004 | Grandy et al. |
| 2005/0204387 A1 | 9/2005 | Knudson et al. |
| 2005/0262542 A1 | 11/2005 | DeWeese et al. |
| 2006/0101022 A1 | 5/2006 | Yu et al. |
| 2006/0149850 A1 | 7/2006 | Bowman |
| 2006/0161621 A1 | 7/2006 | Rosenberg |
| 2006/0174312 A1 | 8/2006 | Ducheneaut et al. |
| 2006/0236352 A1 | 10/2006 | Scott |
| 2006/0271960 A1 | 11/2006 | Jacoby et al. |
| 2007/0157281 A1 | 7/2007 | Ellis et al. |
| 2007/0229651 A1 | 10/2007 | Nakajima |
| 2007/0283380 A1 | 12/2007 | Aoki et al. |
| 2008/0037785 A1 | 2/2008 | Gantman et al. |
| 2008/0163285 A1 | 7/2008 | Tanaka et al. |
| 2009/0063983 A1 | 3/2009 | Amidon et al. |
| 2009/0089840 A1 | 4/2009 | Shusman |
| 2009/0167839 A1 | 7/2009 | Ottmar |
| 2009/0205008 A1 | 8/2009 | Wollmershauser et al. |
| 2009/0319885 A1 | 12/2009 | Amento et al. |
| 2009/0327428 A1 | 12/2009 | Ramanathan et al. |
| 2010/0066804 A1 | 3/2010 | Shoemake et al. |
| 2010/0281108 A1 | 11/2010 | Cohen |
| 2010/0306671 A1 | 12/2010 | Mattingly et al. |
| 2011/0016172 A1 | 1/2011 | Shah |
| 2011/0069940 A1 | 3/2011 | Shimy et al. |
| 2011/0154417 A1 | 6/2011 | Civanlar et al. |
| 2011/0219307 A1 | 9/2011 | Mate et al. |
| 2011/0246908 A1 | 10/2011 | Akram et al. |
| 2012/0131110 A1 | 5/2012 | Buyukkoc et al. |
| 2012/0151345 A1 | 6/2012 | McClements, IV |
| 2012/0216300 A1 | 8/2012 | Vivolo et al. |
| 2012/0218262 A1 | 8/2012 | Yomdin et al. |
| 2012/0246679 A1 | 9/2012 | Chen |
| 2012/0296972 A1 | 11/2012 | Backer |
| 2013/0016955 A1 | 1/2013 | Pejaver |
| 2013/0031192 A1 | 1/2013 | Caspi |
| 2013/0058632 A1 | 3/2013 | Jackson |
| 2013/0103814 A1 * | 4/2013 | Carrasco ............. H04L 65/4015 |
| | | 709/231 |
| 2013/0173765 A1 | 7/2013 | Korbecki |
| 2014/0068692 A1 | 3/2014 | Archibong et al. |
| 2014/0071344 A1 * | 3/2014 | Francisco .......... H04N 21/2625 |
| | | 348/E5.009 |
| 2014/0096167 A1 | 4/2014 | Lang et al. |
| 2014/0150002 A1 | 5/2014 | Hough et al. |
| 2014/0195675 A1 | 7/2014 | Silver |
| 2014/0205261 A1 | 7/2014 | Courtemanche |
| 2014/0269757 A1 | 9/2014 | Park et al. |
| 2014/0325557 A1 | 10/2014 | Evans et al. |
| 2015/0052571 A1 * | 2/2015 | Stokking ............ H04N 21/8547 |
| | | 725/116 |
| 2015/0106360 A1 | 4/2015 | Cao et al. |
| 2015/0172338 A1 | 6/2015 | Moran et al. |
| 2015/0215352 A1 | 7/2015 | Wong et al. |
| 2015/0230004 A1 | 8/2015 | VanDuyn et al. |
| 2015/0245106 A1 | 8/2015 | Tian |
| 2015/0327024 A1 | 11/2015 | Yang et al. |
| 2016/0006981 A1 | 1/2016 | Bauman et al. |
| 2016/0021153 A1 | 1/2016 | Hull et al. |
| 2016/0044622 A1 | 2/2016 | Crowe et al. |
| 2016/0050160 A1 | 2/2016 | Li et al. |
| 2016/0182928 A1 | 6/2016 | Francisco |
| 2016/0241652 A1 | 8/2016 | Frazier et al. |
| 2016/0255041 A1 | 9/2016 | Lew et al. |
| 2016/0294894 A1 | 10/2016 | Miller |
| 2016/0366203 A1 | 12/2016 | Blong et al. |
| 2017/0006322 A1 | 1/2017 | Dury et al. |
| 2017/0093769 A1 | 3/2017 | Lind et al. |
| 2017/0103664 A1 | 4/2017 | Wong et al. |
| 2017/0264920 A1 | 9/2017 | Mickelsen |
| 2017/0312626 A1 | 11/2017 | Colenbrander |
| 2017/0346926 A1 | 11/2017 | Charters et al. |
| 2018/0035136 A1 | 2/2018 | Crowe |
| 2018/0131681 A1 | 5/2018 | Husser |
| 2018/0167427 A1 | 6/2018 | Kedenburg, III |
| 2018/0192000 A1 | 7/2018 | Mercredi et al. |
| 2018/0288467 A1 | 10/2018 | Holmberg et al. |
| 2018/0316939 A1 | 11/2018 | Todd |
| 2018/0330756 A1 | 11/2018 | MacDonald |
| 2018/0365232 A1 | 12/2018 | Lewis et al. |
| 2019/0124159 A1 | 4/2019 | Alsina et al. |
| 2019/0147841 A1 | 5/2019 | Zatepyakin et al. |
| 2019/0155934 A1 | 5/2019 | Delaney et al. |
| 2019/0179610 A1 | 6/2019 | Aiken et al. |
| 2019/0200054 A1 | 6/2019 | Dharmaji |
| 2019/0253742 A1 | 8/2019 | Garten et al. |
| 2019/0303874 A1 | 10/2019 | Yang et al. |
| 2019/0321720 A1 | 10/2019 | Nomura et al. |
| 2020/0029117 A1 | 1/2020 | Kalva et al. |
| 2020/0053312 A1 | 2/2020 | Mukherjee et al. |
| 2020/0112753 A1 | 4/2020 | Stockhammer et al. |
| 2020/0275149 A1 | 8/2020 | Su et al. |
| 2020/0402541 A1 | 12/2020 | Talbot et al. |
| 2021/0001236 A1 | 1/2021 | Srinivasan |
| 2021/0006864 A1 | 1/2021 | Xu et al. |
| 2021/0035559 A1 | 2/2021 | Xu |
| 2021/0036979 A1 | 2/2021 | Madduluri et al. |
| 2021/0037290 A1 | 2/2021 | Madduluri |
| 2021/0037295 A1 | 2/2021 | Strickland |
| 2021/0051034 A1 * | 2/2021 | Jonas .................. H04L 12/1822 |
| 2021/0266621 A1 * | 8/2021 | Marten ................ H04L 65/762 |
| 2021/0321159 A1 * | 10/2021 | Aggarwal .......... H04N 21/8547 |

(56) References Cited

U.S. PATENT DOCUMENTS

| | | |
|---|---|---|
| 2022/0029825 A1 | 1/2022 | Uhr et al. |
| 2022/0040816 A1 | 2/2022 | Eckel et al. |
| 2022/0066621 A1 | 3/2022 | Appelbaum et al. |
| 2022/0070524 A1 | 3/2022 | Iyer et al. |
| 2022/0103873 A1 | 3/2022 | Yoshida et al. |
| 2022/0132214 A1 | 4/2022 | Felman |
| 2022/0141500 A1 | 5/2022 | Du |
| 2022/0166815 A1 | 5/2022 | Gratton et al. |
| 2022/0174357 A1 | 6/2022 | Zavesky et al. |
| 2022/0224659 A1 | 7/2022 | Ghazzal |
| 2022/0256231 A1 | 8/2022 | Eniwumide |
| 2022/0311725 A1 | 9/2022 | Madduluri et al. |
| 2022/0377413 A1 | 11/2022 | Lidaka et al. |
| 2022/0394328 A1 | 12/2022 | Marten |
| 2022/0408161 A1 | 12/2022 | Garten |
| 2023/0147705 A1 | 5/2023 | Huertas et al. |
| 2023/0362461 A1 | 11/2023 | Marten |
| 2024/0040178 A1 | 2/2024 | Marten |
| 2024/0064355 A1 | 2/2024 | Marten |
| 2024/0064356 A1 | 2/2024 | Marten |

FOREIGN PATENT DOCUMENTS

| | | |
|---|---|---|
| WO | PCTIB2021057835 | 8/2021 |
| WO | 2022049466 A1 | 3/2022 |

OTHER PUBLICATIONS

U.S. Appl. No. 17/336,416, Final Office Action, dated Jan. 9, 2022.
U.S. Appl. No. 17/543,925, Non-final Office Action, dated Jan. 31, 2023.
U.S. Appl. No. 62/880,573, filed Jul. 30, 2019, Ramgopal Madduluri.
"Be anyone and reface anything"—downloaded from the Internet on Nov. 3, 2021 from https://hey.reface.ai/.
A. Colaco, I. Kim and C. Schmandt, "Back Talk: An auditory environment for sociable television viewing," 2011 IEEE Consumer Communications and Networking Conference (CCNC), 2011, pp. 352-356, doi: 10.1109/CCNC.2011.5766489. (Year: 2011).
ATSC Standard: ATSC 3.0 System, Doc. A/300:2019, Sep. 17, 2019.
DeepFace Lab for Windows, downloaded from the Internet on Nov. 3, 2021 from https://deepfacelab.en.softonic.com/.
Faceswap, downloaded from the Internet on Nov. 3, 2021 from https://faceswap.dev/.
Family Fun with Deepfakes . . . , downloaded from the Internet on Oct. 23, 2021, from https://towardsdatascience.com/family-fun-with-deepfakes-or-how-i-got-my-wife-onto-the-tonight-show-a4554775c011.
IN-202041037988.
M. 0. van Deventer, H. Stokking, M. Hammond, J. Le Feuvre and P. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).
PCT/IB2021/057835, Int'l Search Report and Written Opinion, Jan. 27, 2022.
U.S. Appl. No. 15/788,058, Prosecution History to date.
U.S. Appl. No. 16/706,764, Prosecution History to Date.
U.S. Appl. No. 16/801,277, Prosecution History to Date.
U.S. Appl. No. 17/087,815, Prosecution History to Date.
U.S. Appl. No. 17/366,416, Prosecution History to date.
U.S. Appl. No. 17/376,459, Prosecution History to date.
U.S. Appl. No. 17/543,852, Prosecution History to date.
U.S. Appl. No. 17/543,886, Prosecution History to date.
U.S. Appl. No. 17/543,925, Prosecution History to date.
U.S. Appl. No. 17/840,966, P00040US03, Prosecution History to Date.
U.S. Appl. No. 17/891,939, Prosecution History to date.
U.S. Appl. No. 16/706,764, filed Dec. 8, 2019.
U.S. Appl. No. 16/801,277, filed Feb. 26, 2020.
U.S. Appl. No. 17/376,459, filed Jul. 15, 2021.
U.S. Appl. No. 18/314,987, filed May 10, 20203.
U.S. Appl. No. 16/801,277, Notice of Allowance & Interview Summary, dated Jul. 12, 2023.
U.S. Appl. No. 16/801,277, Supplemental Amendment & Interview Summary, dated Jun. 27, 2023.
U.S. Appl. No. 17/543,925, Final Office Action, dated Jul. 7, 2023.
U.S. Appl. No. 17/543,925 Response to Final Office Action and eTerminal Disclaimer, dated Jul. 8, 2023.
U.S. Appl. No. 18/222,453, Continuation application as filed, dated Jul. 16, 2023.
U.S. Appl. No. 16/706,764, Notice of Allowability, dated May 11, 2023.
U.S. Appl. No. 16/801,277, RCE and response to Final Office Action, dated Mar. 21, 2023.
U.S. Appl. No. 17/336,416, RCE and Response to Final Office Action, dated Apr. 4, 2023.
U.S. Appl. No. 17/376,459, Notice of Allowance, dated Apr. 24, 2023.
U.S. Appl. No. 17/376,459, Response to Final Office Action, dated Mar. 29, 2023.
U.S. Appl. No. 17/543,852, Response to Non-Final Office Action, dated Apr. 3, 2023.
U.S. Appl. No. 17/543,886, Response to Non-Final Office Action, dated Apr. 5, 2023.
U.S. Appl. No. 18/314,987, Application as filed May 10, 2023.
U.S. Appl. No. 17/336,416, Non-Final Office Action Response, dated Oct. 23, 2023.
U.S. Appl. No. 17/336,416, Non-Final Office Action, dated Jul. 28, 2023.
U.S. Appl. No. 17/543,852, RCE and Response to Non-Final Office Action, dated Aug. 22, 2023.
U.S. Appl. No. 17/543,886, RCE and Response to Final Office Action, dated Aug. 21, 2023.
U.S. Appl. No. 17/543,925, Notice of Allowance and Examiner Interview Summary, dated Jul. 27, 2023.
U.S. Appl. No. 18/363,897, Application as filed Aug. 2, 2023.
U.S. Appl. No. 18/222,453, Notice of Publication, dated Nov. 9, 2023.
U.S. Appl. No. 17/840,966, Non-Final Office Action, dated Oct. 19, 2023.
U.S. Appl. No. 17/543,852, Notice of Allowance, dated Sep. 8, 2023.
U.S. Appl. No. 17/543,886, non-final Office Action, dated Sep. 14, 2023.
U.S. Appl. No. 18/314,987, Non-Final Office Action, dated Sep. 13, 2023.
U.S. Appl. No. 18/484,241, Application filed, Oct. 10, 2023.
U.S. Appl. No. 17/543,852, Final Office Action, dated May 26, 2022.
U.S. Appl. No. 17/543,886, Final Office Action, dated May 25, 2023.
U.S. Appl. No. 17/543,925, Non-final Office Action Response, dated May 29, 2023.
U.S. Appl. No. 17/891,939, Examiner Interview Summary, dated Jun. 8, 2023.
U.S. Appl. No. 17/891,939, Amendment and Examiner Initiated Interview Summary, dated May 31, 2023.
U.S. Appl. No. 17/891,939, Notice of Allowance, dated Jun. 8, 2023.
U.S. Appl. No. 18/314,987, Applicant Initiated Interview Summary, dated Nov. 17, 2023.
U.S. Appl. No. 17/336,416, Final Office Action, dated Dec. 22, 2023.
U.S. Appl. No. 17/336,416, Response to Final Office Action, dated Jan. 9, 2024.
U.S. Appl. No. 17/543,886, Response to non-final Office Action, dated Jan. 5, 2024.
U.S. Appl. No. 17/840,966, Response to non-final Office Action, dated Jan. 5, 2024.
U.S. Appl. No. 18/314,987, Response to Non-Final Ofice Action, dated Dec. 13, 2023.
U.S. Appl. No. 17/840,966, filed Jun. 15, 2022.

(56) References Cited

OTHER PUBLICATIONS

U.S. Appl. No. 18/484,241, filed Oct. 10, 2023.
U.S. Appl. No. 18/222,453, filed Jul. 16, 2023.
U.S. Appl. No. 17/336,416, filed Jun. 2, 2021.
U.S. Appl. No. 17/543,852, filed Dec. 7, 2021.
U.S. Appl. No. 17/543,886, filed Dec. 7, 2021.
U.S. Appl. No. 17/543,925, filed Dec. 7, 2021.
U.S. Appl. No. 17/891,939, filed Aug. 19, 2022.
U.S. Appl. No. 18/363,897, filed Aug. 2, 2023.
U.S. Appl. No. 18/314,987, filed May 10, 2023.
U.S. Appl. No. 17/336,416, Advisory Action, Jan. 29, 2024 (Available at USPTO Patent Center).
U.S. Appl. No. 17/336,416, RCE, Jan. 29, 2024 (Available at USPTO Patent Center).
U.S. Appl. No. 17/336,416, Non-Final Office Action, Feb. 22, 2024 (Available at USPTO Patent Center).
U.S. Appl. No. 17/543,886, Final Office Action, Feb. 15, 2024 (Available at USPTO Patent Center).
U.S. Appl. No. 18/484,241, Notice of Publication, Feb. 2, 2024 (Available at USPTO Patent Center).

\* cited by examiner

LIVE AND RECORDED CONTENT WATCH PARTIES

CROSS-REFERENCE TO RELATED APPLICATIONS

This application is a Continuation of and claims priority to U.S. patent application Ser. No. 17/087,815, filed on 3 Nov. 2020, in the name of inventors Satish Balasubramanian Iyer, Girish Pai Mangaldas, Mahesh Thatumparmbil Viswanathan, and Nishit Dabi, and entitled "DEVICES, SYSTEMS AND PROCESSES FOR FACILITATING LIVE AND RECORDED CONTENT WATCH PARTIES", and further claims priority to Indian provisional patent application serial number 202041037988, filed on Sep. 3, 2020, in the name of inventors Satish Balasubramanian Iyer, Girish Pai Mangaldas, Mahesh Thatumparmbil Viswanathan, and Nishit Dabi, and entitled "DEVICES, SYSTEMS AND PROCESSES FOR FACILITATING LIVE AND RECORDED CONTENT WATCH PARTIES". The entire contents of each of the above applications are incorporated herein by reference.

TECHNICAL FIELD

The technology described herein generally relates to devices, systems, and processes for facilitating live and/or recorded content watch parties.

BACKGROUND

Various devices, systems and processes today enable a person to be presented with "live" and/or "recorded" content (as defined below), such as a football game, television show, video game, soundtrack, or the like using a presentation device. Such content may be presented to a user in a humanly perceptible format, such as visually, audibly, as vibrations, combinations of the foregoing, or otherwise. Often a first user desires to be presented with such content at substantially the same time as another, second user. The second user may be physically located remotely to the first user, such as in another building, city, state, country or otherwise. The first user and the second user may desire to receive such content and together participate in the reception of such live and/or recorded content. Such participation may include the sharing of their reactions, audibly, visibly, or otherwise to such content with each other and at substantially the same time as the content is presented to each of the users.

Yet, today, devices, systems, and processes for facilitating such substantially simultaneous presentation of a given live and/or recorded content and user reactions thereto to multiple, geographically dispersed users are inadequate.

Further, today, devices, systems, and processes for facilitating substantially simultaneous presentation of a given content and user reactions thereto are often limited by bandwidth, latency, and other technical considerations, such that a common viewing experience for all user of the content are also limited by the lowest quality content provided to a given user. Such lowest quality content level often being less than a high quality content presentation. Further, such systems commonly require a combined delivery, by a single source, such as a server, of both the content and user reactions to be shared amongst a watch party participants. Decoupled systems and processes are needed.

The various embodiments of the present disclosure address the above and other inadequacies of current devices, systems, and processes for facilitating watch parties.

SUMMARY

The various embodiments of the present disclosure describe devices, systems, and processes for facilitating "watch parties" for live and/or recorded content.

In accordance with at least one embodiment of the present disclosure, a system for facilitating content watch parties may include a sync server comprising a server CPU, a host user device communicatively coupled to the sync server, a client user device communicatively coupled to the sync server and a content provider, communicatively coupled to each of the host user device and the client user device. For at least one embodiment, the content provider may be configured to first provide a first portion of the given content independently to each of the host user device and the client user device. For at least one embodiment, the content provider may be further configured to independently second provide a second portion of the given content to each of the host user device and the client user device. For at least one embodiment, the first providing of the first portion of the given content may occur separately of the second providing of the second portion of the given content. For at least one embodiment, the sync server may be configured to synchronize the second providing of the second portion of the given content to the client user device to facilitate substantially simultaneously presentations of the second portion of the given content by each of the host user device and the client user device.

For at least one embodiment, a system for facilitating content watch parties may be configured for use wherein the given content comprises live content.

For at least one embodiment, a system for facilitating content watch parties may be configured for use with a content provider that includes a content distribution network including a host content node and a client content node. For at least one embodiment, the host user device may be communicatively coupled to the host content node and the client user device may be communicatively coupled to one of the client content node.

For at least one embodiment, a system for facilitating content watch parties may be configured for use with a server CPU configured to instantiate a server sync engine. For at least one embodiment, the server sync engine may be configured to execute first non-transient computer instructions for facilitating the synchronization of the second providing of the given content to the client user device with the first providing of the given content to the host user device, by performing synchronization operations. For at least one embodiment, such synchronization operations may include one or more of: determining when a first portion of the given content is first received, at a first time, by the host user device; determining when the first portion of the given content is second received, at a second time, by the client user device; determining any delay between the first time and the second time; setting, based on the delay, an adjustment; adjusting by the client user device and based on the adjustment, a client user device presentation of the given content; and not adjusting by the host user device a host user device presentation of the given content. For at least one embodiment, the adjusting facilitates substantially simultaneous presentation of another portion of the given content by the client user device and the host user device.

For at least one embodiment, a system for facilitating content watch parties may be configured for adjusting the client user device presentation of the given content further by applying a trick-play mode operation to the given content. For at least one embodiment, the trick-play mode operation comprises one of a pause and a seek operation.

For at least one embodiment, a system for facilitating content watch parties may be configured to perform synchronization operations. For at least one embodiment, one or more of such synchronization operations may include: determining whether the delay exceeds a delay interval; when the delay exceeds the delay interval, setting the adjustment; and when the delay does not exceed the delay interval, periodically determining whether a current portion of the given content is being presented substantially simultaneously by each of the host user device and the client user device. For at least one embodiment, a system for facilitating content watch parties may be configured for use when the delay interval is a predetermined delay of between 100 milliseconds and 1000 milliseconds.

For at least one embodiment, a system for facilitating content watch parties may be configured for use with a server CPU configured to instantiate a server conference engine. For at least one embodiment, the server conference engine may be configured to execute second non-transient computer instructions for facilitating collaboration between a host user device user and a client user device user by performing conferencing operations including: determining whether a conference interrupt has been received by the sync server; and when received, determining a type of the conference interrupt. For at least one embodiment, a system for facilitating content watch parties may be configured for use where a type of the conference interrupt is at least one of an audible interrupt, a visual interrupt, a text interrupt, and a gesture interrupt.

For at least one embodiment, a system for facilitating content watch parties may be configured for use where the type of the conference interrupt is a first audible interrupt and where the conferencing operations may include one or more of: identifying a sending device of the first audible interrupt; identifying a receiving device for the first audible interrupt; wherein the sending device is one of the host user device and the client user device and the receiving device is the other of the host user device and the client user device; first reducing a first volume setting at the sending device; wherein the first volume setting is for an audio portion of the given content; second reducing the first volume setting at a receiving device; unmuting the sending device; wherein upon being unmuted the sending device is configured to communicate a first audible component to the sync server; receiving the first audible component from the sending device; communicating the first audible component to the receiving device; determining whether a second audible interrupt request has been received to provide a second audible component; and if a second audible interrupt request has been received, prioritizing the first audible interrupt request and the second audible interrupt request; and based on the determined priority, outputting one of the first audible component and a second audible component.

For at least one embodiment, a system for facilitating content watch parties may be configured for use where the first reducing and the second reducing respectively reduce the first volume setting by a first percentage (X %) and by a second percentage (Y %). For at least one embodiment, a system for facilitating content watch parties may be configured for use where the first percentage (X %) differs from the second percentage (Y %).

For at least one embodiment, a system for facilitating content watch parties may be configured for use with a ten-foot device communicatively coupled to the content provider and the client user device. For at least one embodiment, the server CPU may be further configured to instantiate a server conference engine. The server conference engine may be configured to execute non-transient computer instructions for synchronizing collaborations arising between users of the host user device and the client user device with one or more presentations of portions of the given content.

For at least one embodiment, a system for facilitating content watch parties may be configured for use with an external output device communicatively coupled to the ten-foot device and the client user device. For at least one embodiment, the client user device may include an internal output device and the collaborations may be presented to a client user using the internal output device. For at least one embodiment, portions of the given content may be presented to the client user using the external output device.

For at least one embodiment, a system for facilitating content watch parties may be configured for use a server CPU configured to instantiate a server conference engine. For at least one embodiment, the server conference engine may be configured to execute second non-transient computer instructions for facilitating collaboration between a host user device user and a client user device user by performing conferencing operations. For at least one embodiment, conferencing operations may include one or more of: determining whether a conference interrupt has been received by the sync server; and when received, determining a type of the conference interrupt. For at least one embodiment, the type of the conference interrupt received by the sync server may be a first audible interrupt and the conferencing operations further include one or more operations of: identifying a sending device of the first audible interrupt; and identifying a receiving device for the first audible interrupt. For at least one embodiment, the sending device may be one of the host user device and the client user device and the receiving device is the other of the host user device and the client user device.

For at least one embodiment, the operations may include first reducing a first volume setting at the sending device. For at least one embodiment, the first volume setting may be for an audio portion of the given content. For at least one embodiment, the operations may include one or more of: second reducing the first volume setting at a receiving device; and unmuting the sending device. For at least one embodiment, upon being unmuted the sending device may be configured to communicate a first audible component to the sync server.

For at least one embodiment, the operations may include one or more of: receiving the first audible component from the sending device; communicating the first audible component to the receiving device; determining whether a second audible interrupt request has been received to provide a second audible component; if a second audible interrupt request has been received, prioritizing the first audible interrupt request and the second audible interrupt request; and based on the determined priority, outputting one of the first audible component and a second audible component.

For at least one embodiment, a system for facilitating content watch parties may include a sync server comprising a server CPU. For at least one embodiment, the server CPU may be configured to execute non-transient computer instructions for instantiating a server conference engine and a server sync engine. For at least one embodiment, the system may include a host user device, communicatively coupled to the sync server, comprising a host CPU. The host CPU may be configured to execute non-transient computer instructions for instantiating a host sync engine.

For at least one embodiment, the system may include a client user device, communicatively coupled to the sync server, comprising a client CPU. The client CPU may be configured to execute non-transient computer instructions for instantiating a client sync engine.

For at least one embodiment, the system may include a content provider further comprising a content distribution network having a host content node and a client content node. For at least one embodiment, the host content node may be communicatively coupled to the host user device and the client content node may be communicatively coupled to the client user device.

For at least one embodiment, the content provider may be configured to first provide a first portion of the given content and to second provide a second portion of the given content to each of the host user device and the client user device.

For at least one embodiment, the first providing of the first portion of the given content may occur separately of the second providing of the second portion of the given content. For at least one embodiment, the sync server, the host sync engine and the client sync engine may each be configured to cooperatively synchronize the second providing of the second portion of the given content to the client user device to facilitate substantially simultaneously presentations of the second portion of the given content by each of the host user device and the client user device.

For at least one embodiment, a system for facilitating content watch parties may be configured for use wherein one or more of: the server CPU is configured to instantiate a server conference engine; the host CPU is configured to instantiate a host conference engine; the client CPU is configured to instantiate a client conference engine, and the server conference engine; the host conference engine; and the client conference engine are each configured to cooperatively synchronize a collaboration arising between the host user device and the client user device with the presentations of the second portion of the given content by each of the host user device and the client user device.

In accordance with at least one embodiment of the present disclosure, a method for facilitating content watch parties may include one or more operations of: inviting, by a host user device, a client user device to attend a watch party; receiving an acceptance from the client user device; and designating the client user device as a participating client user device.

For at least one embodiment, the watch party may be facilitated by a sync server communicatively coupled to each of the host user device and the participating client user device.

For at least one embodiment, the method may include operations of separately accessing content, from a content provider, by each of the host user device and the participating client user device. For at least one embodiment, the operations may include associating, by the host user device, a host time of receipt for a given content portion and outputting host sync data reflective thereof to the sync server. For at least one embodiment, the operations may include determining, by the participating client user device, a client time of receipt for the given content portion and outputting client sync data reflective thereof to the sync server. For at least one embodiment, the operations may include determining, by the sync server, any delay arising in the host time of receipt and the client time of receipt, as provided by the host sync data and the client sync data. For at least one embodiment, the operations may include adjusting a presentation of a second content portion by the client user device based upon the determined delay. For at least one embodiment, upon adjustment, the second content portion is presented substantially simultaneously by each of the client user device and the host user device.

For at least one embodiment, a method for facilitating content watch parties may include one or more operations of: determining whether any collaboration is occurring between the host user device and the client user device during the watch party; and synchronizing the presenting of the collaboration with the presenting of the content during the watch party. For at least one embodiment, the synchronizing of the presenting of the collaboration with the presenting of the content during the watch party may include reducing a volume setting for the content while the collaboration includes communication of an audible component between the host user device and the client user device.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

Figure 1:
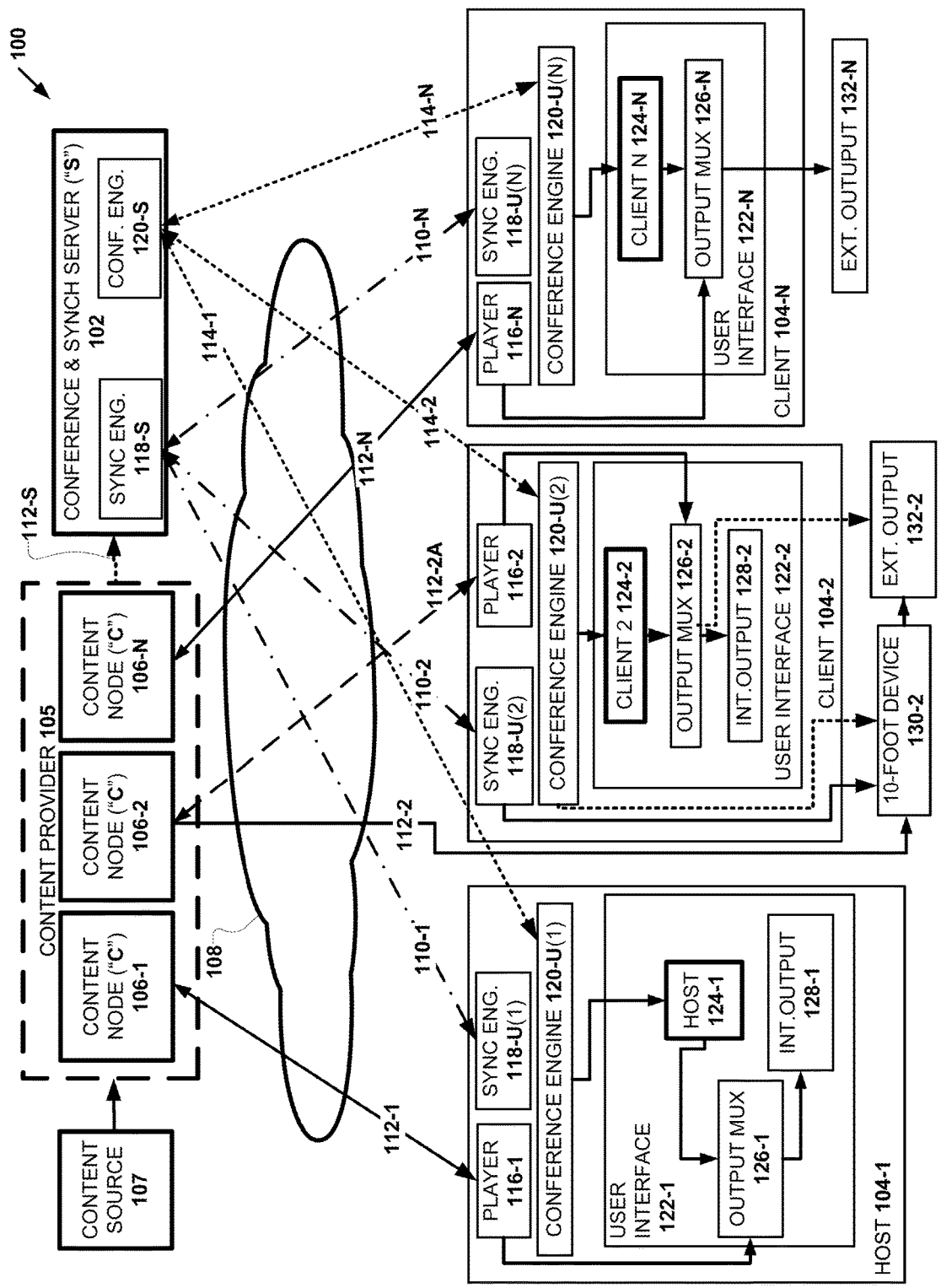
FIG. 1 is a schematic illustration of a system for facilitating live and/or recorded content watch parties and in accordance with at least one embodiment of the present disclosure.

The various embodiments of the present disclosure describe devices, systems, and processes for facilitating live and/or recorded content watch parties.

As used herein, "live" refers to a transmission and presentation of content to two or more users that occurs within less than one minute of a first availability of such content for presentation to such two or more users. In contrast, "recorded" refers to content first available to two or more users and where such content is delayed and/or later presented to two or more users more than one minute after the first availability of such content, such as, on an on-demand, time delayed, or other basis.

As used herein, "content" refers to any humanly perceptible information, such as video, television programs, audio programs, speeches, concerts, gaming, or otherwise. The content may originate from any source, including live and/or recorded, augmented reality, virtual reality, computer generated, or otherwise. The content may be presented to a given user using any desired user device (as described below). For at least one embodiment, content may be made available by a producer, publisher, distributor, or other source of such content. For example, a producer for a new television series may initiate a watch party available to select, all, or other combinations of user devices. That is, watch parties may be used for promotional purposes. Watch parties may also be used for any other desired, lawful purpose; non-limiting examples including gambling, sporting contests, shopping, educational and training, cooking, or otherwise. For at least one embodiment, watch parties may be used for sporting contests, such as MARCH MADNESS, the OLYMPICS, the WORLD CUP, FORMULA 1 races, or otherwise to facilitate common viewing of real-time content of particular interest to one or more users. For example, last minute action in a basketball game may be presented to multiple users during a watch party.

As used herein, a "watch party" is a virtual event where two or more users collectively are "separately" and "collaboratively" presented with the same live and/or recorded content.

As used herein, "separately" when referring to two or more users participating in a watch party, means a first user may be physically or virtually separated from one or more second users such that each user is uniquely and independently provided a given content by a content provider. For at least one embodiment, such separation may include a geographic separation, wherein a first user is in a different room, building, city, state, or country than one or more second users. For at least one embodiment, a separation may occur virtually, such as when a first user receives the content and/or reaction(s) as presented, in whole or in part, in a first format (such as an audible portion of the football game in a first language), while a second user receives the content and/or reactions in a second format (such as the audible portion of the football game being provided in a second language). For at least one embodiment, separation may occur one or more of geographically and virtually.

As used herein, "collaboratively" means that a given users "reaction" to the live and/or recorded content may be captured and shared with each other user participating in the watch party substantially simultaneously. For example and for at least one embodiment, a cheering by a first user in response to a goal scored in a football game (the content)—the cheering being a "reaction"—is separately presented to a second user at substantially the same time that the first user reacts to their viewing of the scoring of the goal. In essence, the second user is presented with the first user's reaction as if they both were physically present in a same room and viewing the football game together.

As used herein, "substantially simultaneous" means without incurring a humanly perceptible delay of greater than one second between a presentation of one or more, if not both, of the content and a reaction to such content by a given user, to two or more other users.

In accordance with at least one embodiment, a live and/or recorded content watch party may include the presentation of audio and video, for a given content, to users with "low latency" and at "high quality." As used herein, "low latency" means a transmission of content from a source to a user device with less than a one second delay between the time of transmission of the content by the source and reception of such content by the user device. As used herein, "high quality" when referring to audio-video (A/V) content (for example and not by limitation) means that the content is transmitted by a content source directly, for example using a direct satellite connection, or indirectly, for example, using a network, to a user device at three or more megabytes per second (3 MBPS), at a video resolution equal to or greater than the 720 p "high definition television" ("HDTV") standard. For at least one embodiment, high quality may include the use of adaptive bit rate ("ABR") transmission technologies. Such ABR technologies may be configured to provide content at a "low latency" while using a varying video resolution over time. In contrast, "medium quality" means AV content that is transmitted by a content source to a user device at a "standard definition television" (SDTV) standard.

As used herein, "(in)directly" means that a transmission of a given content from a source to a given user device may be direct, such as occurs with radio and satellite broadcast television signals, or indirect, such as occurs with streaming and over-the-top (OTT) transmissions. Indirect transmissions may include use of various network technologies, including "Cloud" technologies. As used herein, a reference to "Cloud" includes without limitation references to cloud computing, cloud storage, cloud communications, and/or other technology resources which do not require a viewer to actively manage the providing or use of such resources. A usage of a Cloud resource may be private (limited to certain users and/or uses), public (available for many users and/or uses), hybrid, dedicated, non-dedicated, or otherwise. It is to be appreciated that any device or system of the various embodiments of the present disclosure may use Cloud resources to provide for processing, storage and other functions related to facilitating live and/or recorded content watch parties.

Watch Party System 100

As shown in FIG. 1, system 100 for facilitating live and/or recorded content watch parties may include a conference and synchronization sync server 102 (herein, also referred to as the "sync server" 102). The sync server 102 may be communicatively coupled by a communications network 108, such as one that utilizes in whole or in part the Cloud, to each of two or more user devices, such as user devices 104-1, 104-2 and 104-N (where "N" is an integer) and using sync links 110-1/2/N and conference links 114-1/2/N.

Each of the two or more user devices 104-1/2/N may be communicatively coupled to at least one content node 106. The content node may be associated with a content provider 105 that receives content ("content information") from a content source 106. Such communicative coupling of a user device 104 with a content node 106, such as content nodes 106-1, 106-2 and 106-N, may include use of content links 112-1/2/N. For at least one embodiment, the content nodes 106-1/2/N may be provided individually and/or collectively by the content provider 105 and/or content source 107. Non-limiting examples of content providers 105 include SLING TV, NETFLIX, AMAZON PRIME, and others. Content providers 105 commonly receive content from content sources 107. Non-limiting examples of content sources 107 include television networks, such as ABC, NBC and the like, pay-per-view transmission, online channels, and otherwise. Each user device 104 may be coupled to one or more presentation devices, such as internal output device 128 or external output device 132. When connected to external output device 132, a user device may be directly connected or indirectly connected. Such an indirect connection may include use of an intermediary device, herein a "10-Foot Device" 130. Non-limiting examples of a 10-Foot device 130 include, but are not limited to, ROKU devices, AMAZON FIRE TV, APPLE TV, and the like.

For at least one embodiment, a content provider 105 and/or one or more content nodes 106-1/2/N may include use of a content distribution network ("CDN"). As is well known in the art, a CDN commonly is a geographically distributed network of proxy servers and data centers configured to provide content to end users. Each of these system components are further described below.

Sync Server 102

As shown in FIG. 1, the sync server 102 may include two or more "engines" including a "server synch engine" 118-S and a "server conference engine" 120-S (where the "S" designates server, as discussed further herein, a "U" designates a corresponding engine in a user device 140). As used herein, an "engine" refers to at least one of a dedicated hardware, such as an application specific integrated circuit (an "ASIC"), a combination of hardware with specially purposed computer instructions, a combination of general purpose hardware, such as a central processing unit ("CPU") and non-volatile computer instructions (as defined below) configured to perform certain data processing operations, and the like. It is to be appreciated that such engines may be provided separately, collectively, or otherwise by one or more correspondingly configured physical devices, systems, and/or collection of devices and systems, including but not limited to those provided using a distributed system or otherwise. The sync server 102 may be any computing device capable of facilitating one or more of the operations described herein, with respect to the flow diagram of FIGS. 3A to 3E, and/or otherwise provided by an embodiment of the present disclosure.

Server CPU 202

Figure 2A:
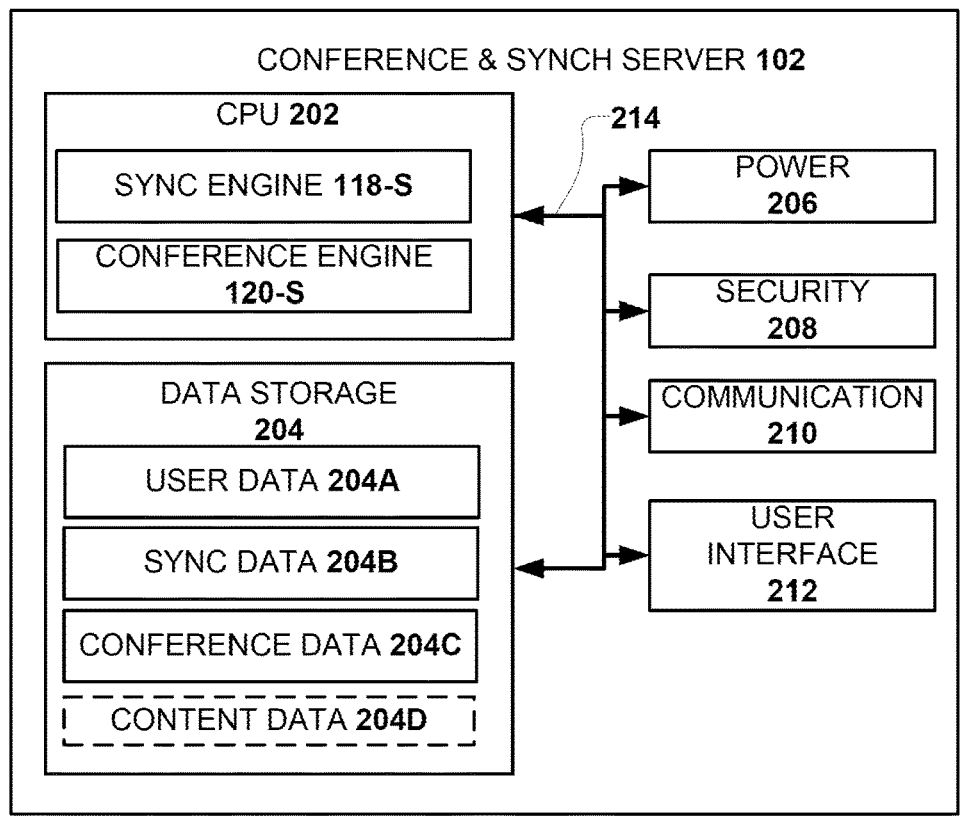
FIG. 2A is a schematic illustration of a conferencing and synchronization server configured for use in facilitating live and/or recorded content watch parties and in accordance with at least one embodiment of the present disclosure.

As shown in FIG. 2A and for at least one embodiment of the present disclosure, the sync server 102 may include a server central processing unit (CPU) 202 or similar electrical data processing device. Any known or later arising CPU may be used. The server CPU 202 may be provided by any local processing device capable of executing one more non-transient computer executable instructions (herein, each a "computer instruction") which, in accordance with an embodiment of the present disclosure, facilitate one or more data processing operations including, but not limited to, the server sync engine 118-S and the server conference engine 120-S. It is to be appreciated that for at least one embodiment, one or more of the server engines 118-S and 120-S may be combined and/or provided separately.

The server CPU 202 may include one or more physical (as compared to logical) components configured for such data processing operations. For at least one embodiment, the server CPU 202 may include one or more hardware processors, such as 32-bit and 64-bit central processing units, multi-core ARM based processors, microprocessors, microcontrollers, and otherwise. The computer instructions may include instructions for executing one or more applications, software engines, and/or processes configured to perform computer executable operations. Such hardware and computer instructions may arise in any desired computing configuration including, but not limited to, local, remote, distributed, blade, virtual, or other configurations and/or systems configured for use in support of the one or more embodiments of the present disclosure. Any known or later arising technologies may be utilized in conjunction with an embodiment of the present disclosure to facilitate the server CPU 202, the server sync engine 118-S, and/or the server conference engine 120-S.

The server CPU 202 may be communicatively coupled, by a server data bus 214 or similar structure, to other components of the server including, but not limited to, a server data storage module 204, which may also be referred to as a "computer readable storage medium."

Server Sync Engine 118-S

For at least one embodiment, a server sync engine 118-S may be configured to manage synchronization of content during a live and/or recorded content watch party and while such content is provided separately by given content nodes 106-1/2/N to respective user devices 104-1/2/N. Status information regarding the communication of content from a content node 106 to a user device 104 may be provided to the sync server 102 and server sync engine 118-S using the two or more sync links 110-1/2/N. For at least one embodiment, a one-to-one correspondence may be used between a given content node 106 and a given user device 104. Similarly, a one-to-one correspondence may be used between a given user device 104 and a sync engine 118-S. For at least one embodiment, each content node 106 may be configured to operate, as perceived by a given user device 106 and as monitored by the server sync engine 118-S as an independent communication of the given content to the given user device 104. For at least one embodiment, the independent providing of such content by a given content node 106 to a given user device 104 may be decoupled from communications, devices, services, and the like used by the sync server 102 to facilitate synchronization of content presentation across all user devices 104 while such user devices 104 are participating in a given watch party. It is to be appreciated that by decoupling the providing of the content from the synchronization of such content by the sync server 102, the various embodiments of the present disclosure realize economies of scale in CDN usage, user device 104 characteristics and capabilities, synchronization protocols, and the like that may not be realizable by currently known/prior art watch party approaches where both content to be provided and the synchronization of such content is provided and controlled by a common server.

For at least one embodiment, the server sync engine 118-S may be configured to facilitate synchronization of such content by designating a given user device 104, such as a first or "host" user device 104-1, while designating each of the remaining user devices participating in a given watch party as a "client"—such as user devices 104-2 and 104-N. For at least one embodiment, a user device 104 initiating a watch party may be automatically designated as the host user device. For other embodiments, a given user device 104 participating in a given watch party may be designated as the host at any time during the watch party. Such designation may occur, for example, when the user device 104-1 previously designated as the "host" drops out of the watch party for any or no reason including, but not limited to, technical difficulties or otherwise.

For at least one embodiment, the server sync engine 118-S may be configured to designate another user device, such as client user device 104-2, as the host, when a prior host is no longer participating in a given watch party, or as otherwise needed. For at least one embodiment, a then active host user device 104-1 and/or the host user device which initiated the watch party (the "initiating user device") may designate one or more client user devices 104-2 as each being a "presenter." When designated as a presenter, a client user device 104-2 may be configured to include the one or more watch party capabilities of a host user device 104-1; such capabilities may become active when a host user device 104-1 is no longer present during the watch party, as designated by a then active and/or the initiating user device 104-1 (e.g., by a passing of control from a then active host user device 104-1 to a presenter configured client user device 104-2), or otherwise. Fail-over and other designation rules may be established, and provided by computer instructions for governing if and when a re-designation of a client user device 104-2 as a "presenter" and/or as a host user device 104-1 is to occur for a given watch party. For at least one embodiment, only one user device 104 is designated as the host user device 104-1 at any given time during a watch party, with all other client user devices remaining designated as clients, excluding the initiating user device which maintains host user devices capabilities during an entirety of a given watch party. For at least one embodiment, only one initiating user device exists for any given watch party. For at least one embodiment, the initiating user device 104-1 and/or a then active host user device 104-1 may designate a given client user device 104-2 as a "presenter" at any given time. Such privileges may also be revoked, transferred, or otherwise designated, at any time, by the then active host user device and/or by the initiating user device. For at least one embodiment, if the host user device 104-1 is disconnected from the watch party, the server sync engine 118-S may be configured to immediately, after an elapsing of a pre-determined period, after an elapsing of a then determined period, or based on some other period, event, or otherwise, suspend, and/or cancel, the watch party until a host user device 104-1 (which may be the initiating user device or a designated presenter) is able to rejoin or continue, as the case may be, the watch party, in the host user device capacity. For at least one embodiment, multiple watch parties may be established with respect to a given content. A given user device may be configured to participate in such multiple watch parties, and each such watch party may include a subset of user devices otherwise participating in a collection of watch parties for a given event. A given user device may be designated as an initiating user device and/or as a host user device for multiple watch parties. For example, a professional sports league, such as the NFL, may be designated as an initiating user device, while a team may be designated as a host for a live and/or recorded presentation of a sporting event, with multiple watch parties being established for multiple users of disparate locations, interests, languages, or otherwise. For another embodiment, a given user may be an initiating user while a family member thereof may be a host. For example, and not by limitation, a grandson initiating a watch party for which the grandparent is the host. For at least one embodiment, a given user device may be designated as a client for only one watch party at a time.

For at least one embodiment, the server sync engine 118-S may be configured to facilitate synchronize a presentation of the content on all user devices 104 based upon "content timing information" provided by the designated host user device 104-1 to the server sync engine 118-S and thereby to each client user device 104-2/N for a given watch party. Such content timing information may be provided on any desired periodicity by the host 104-1 to the server sync engine 118-S.

For at least one embodiment and as used herein, "content timing information" is information that provides a relationship between a given portion of content and a time at which a given portion of the content is received by a given user device, such as the host 104-1. For at least one embodiment, a standardized time designator, such as a universal time code ("UTC"), may be used for the content timing information. For at least one embodiment, a given UTC time may be uniquely associated with an identifiable portion of content, as such when a given content portion is received by the given user device, such as by the host 104-1. A non-limiting example of a uniquely identifiable portion of content includes a frame of A/V content capable of being independently rendered by a user device 104, such as an "I" frame in a motion pictures expert group ("MPEG") group of pictures ("GOP").

For at least one embodiment, the server sync engine 118-S may be configured to periodically receive content timing information from the host user device 104-1. For at least one embodiment, the server sync engine 118-S may be configured to periodically receive content timing information from one or more client user devices 104-2/N. For at least one embodiment, the server sync engine 118-S may be configured to periodically receive content timing information from only the host user device 104-1. For at least one embodiment, the server sync engine 118-S may be configured to receive content timing information from the host user device 104-1 on a different periodicity than is content timing information received from one or more client user devices 104-2/N. For at least one embodiment, the server sync engine 118-S may be configured to receive content timing information from any given user device 104-1/2/N participating in a given watch party on any basis, periodicity, or otherwise.

For at least one embodiment, the server sync engine 118-S may be configured to facilitate use of a "trick-play mode" operations during a watch party. As used herein, a "trick-play mode" operation is an computer operation, which when applied to one or more portions of a given content, results in such one or more portions of the given content being presented to a user at an earlier time, at a later time, not presented, paused in the presenting of, or otherwise presented than would normally occur were such one or more portions of the given content allowed to be presented in a normal and serial manner, such as by use of a first-in/first-out buffer or the like. Non-limiting examples of trick-play modes include: Pause, Play, Skip, Fast Forward, Reverse, Stop, Seek, and the like.

For at least one embodiment, trick-play modes (when supported for a given content) may be selected by the host user device 104-1. For at least one embodiment, trick-play modes (when supported for a given content) may be requested by a client user device 104-2/N for approval of and selected by the host user device 104-1. For at least one embodiment, a selected trick-play mode is communicated by the host user device 104-1 to the server sync engine 118-S, which further communicates such selected trick-play mode to each client user device 104-2/N participating in the given watch party. For at least one embodiment, a communication of a selected trick-play mode by a host user device 104-1 to the server sync engine 118-S may include content timing information specifying a start location for the selected trick-play mode, an identification of the type of trick-play mode selected, and (where appropriate) an end UTC location specifying where normal play mode is to resume, and/or other information useful in facilitating implementation of the selected trick-play mode by each of the client user devices 104-2/N participating in the given watch party.

For at least one embodiment, the server sync engine 118-S may be configured to modify trick-play instructions, as received from a host user device 104-1, and then provide modified trick-play instructions to one or more client user devices 104-2/N. Such trick-play instructions, modified or unmodified, may be unique for given client user device, common to all client user devices, or otherwise. It is to be appreciated that modifications of trick-play instructions, as provided to one or more client user devices 104-2/N, may be in view of and/or based upon client content timing information as received from a given client user device 104-2/N. Such client content timing information may be indicative of synchronization issues a given client user device has been experiencing during a given watch party, such as repeatedly receiving the given content at a faster or slower rate than occurs with respect to the host user device 104-1 and adjustments instructed by the server sync engine 118-S to such client user device 104-2/N in order to support collaboration during the watch party.

For at least one embodiment, the server sync engine 118-S may be configured such that a given content segment, as communicated to each of the two or more client user devices 104-2/N participating in a given watch party, occurs such that any latency, user device delays, and/or other issues arising with the communication, processing, and/or presenting of a given portion of the content by a given client user device may be addressed (if addressable) such that the presentation of future arising given content segments occurs substantially simultaneously across each client user device 104-2/N, with respect to the host user device 104-1. For at least one embodiment, the server sync engine 118-S may be configured to facilitate synchronization of content such that presentation thereof occurs substantially simultaneously across all user devices 104-1/2/N participating in a given watch party.

For at least one embodiment, the server sync engine 118-S may be configured such that adjustments to presentations of content by client user devices 104-2/N, in view of content timing information provided by the host user device 104-1, occurs such that the presentation of such content by the client user device(s) 104-2/N is at one or more of a preferred quality setting, a minimum quality setting, a maximum quality setting, or otherwise.

For at least one embodiment, when a specified quality setting is not achievable, at a given time and/or over a given period, by a given client user device 104-2/N (herein, a "wayward client device"), the server sync engine 118-S may be configured to take corrective actions until such desired quality settings can be realized by the wayward client device. Non-limiting examples of such corrective actions include: pausing, by the wayward client device itself, a presenting of the content; instructing the content node 106-2/N communicatively coupled to the wayward client device to fast forward, slow down, pause, or other modify how content is provided to the wayward client device; identifying an alternative content link to another content node 106 configurable to provide content to the wayward client device at a desired download speed, quality, and/or the like; disabling sharing of reactions, in one or more formats (such as audio and video), to and/or from one or more user devices with respect to the wayward client device; providing an option to a user of the wayward client device to accept a different quality level; dropping the wayward client device from the watch party; or taking other corrective actions.

For at least one embodiment, the server sync engine 118-S may be configured to use sync data 204B including, but not limited to, content timing information provided by one or more user devices 104-1/2/N. Sync data 204B may also include computer instructions used to facilitate synchronization of content presentation during a watch party. Non-limiting examples of sync data 204B may also include communications sockets used by user devices to connect with a content provider 105 and/or a content node 106-1/2/N, IP addresses for user devices, user device identifiers, such as MAC addresses, communications network settings used for one or more of the content links 112-1/2/N, sync links 110-1/2/N, and otherwise. For at least one embodiment, the server sync engine 118-S may be configured to use user data 204A to a facilitate synchronization of content during a watch party. Non-limiting examples of user data 204A include user demographic information, user device information such as capabilities, technologies supported, and the like, user preferences, user viewing histories, and the like.

It is to be appreciated that a sync link 110-1/2/N used may change as the location of a given user device 104 changes. For example, a user device 104 may participate in a first watch party from a home location using a high-speed Internet connection, while participating in a second watch party using a 4G cellular connection. Accordingly, it is to be appreciated that sync data 204B determined and stored and the frequency of such determining and storing may vary based upon a type of connection then being used by a given user device 104 while participating in a watch party. Such sync data 204B may be used by the sync server 102 in initially configuring the sync link 110 between the sync server 102 and a given user device 104 and in reconfiguring, such as by adjusting a bitrate utilized, the sync link 110 used, or other connection parameter during the watch party to facilitate substantially simultaneous presentation of content to multiple users during a watch party.

Server Conference Engine 120-S

For at least one embodiment, a server conference engine 120-S may be configured to facilitate collaboration by and between users, via their respective user devices 104, during a watch party, and using the two or more conference links 114-1/2/N. For at least one embodiment the conference links 114-1/2/N may be provided separate of the sync links 110-1/2/N. For at least one embodiment, the conference links 114-1/2/N and sync links 10-1/2/N may be provided jointly.

For at least one embodiment, synchronization of and collaboration by and between users (via their respective user devices 104) during a given watch party may be decoupled from one or more of a providing of content (by the content nodes 106 to the user devices 104) and/or any synchronization of content presentation, as facilitated by the server conference engine 120-S. For at least one embodiment, the providing of reactions by and between user devices 106 may arise independently and be shared independently of other watch party elements.

For at least one embodiment, the server conference engine 120-S may be configured to support collaboration between users in any humanly perceptible format; non-limiting examples including speech, video, text, emoticons, gestures, or otherwise. For at least one embodiment, the conference links 114-1/2/N and collaborative aspects of a watch party may be established or unestablished at any time before, during, or after a given watch party.

For at least one embodiment, the server conference engine 120-S may be configured to leverage proprietary, custom, open source, or otherwise provided conferencing software applications including, but not limited to, JITSI MEET, WEBEX, ZOOM, and otherwise.

For at least one embodiment, the server conference engine 120-S may be configured to utilize conference data 204C provided by the server data storage module 204. Conference data 204C may include any data and/or computer instructions which facilitate collaboration during a watch party. Non-limiting examples of conference data 204C include communications sockets used by user devices, IP addresses for user devices, user device identifiers, such as MAC addresses, communications network settings used for one or more conference links 114-1/2/N and otherwise. For at least one embodiment, the server conference engine 120-S may be configured to use user data 204A to a facilitate collaboration during a watch party.

Further, various conference data 204C may be stored in the storage device 204 and used by the server conference engine 120-S in facilitating collaboration during a watch party. Non-limiting examples of such conference data 204C include type of connection, distance of user device from sync server 102, maximum available bandwidth for a given conference link 114-1/2/N, throughput for the conference link 114, latency, and other data. Conference data 204C may be provided for each conference link 114-1/2/N used during a watch party. It is to be appreciated that a conference link 114-1/2/N used may change as the location of a given user device 104 changes. For example, a user device 104 may participate in a first watch party from a home location using a high-speed Internet connection, while participating in a second watch party using a 4G cellular connection. Accordingly, it is to be appreciated that connection data determined and stored and the frequency of such determining and storing may vary based upon a type of connection then being used by a given user device while participating in a watch party. Such connection data may be used by the sync server 104 in initially configuring the conference link between the sync server 102 and a given user device 104 and in reconfiguring, such as by adjusting a bitrate utilized, the conference link 114 used during the watch party to facilitate substantially simultaneous presentation of content to multiple users during a watch party.

For at least one embodiment, the server conference engine 120-S may be configured to facilitate any desired singular or combination of voice, video, web, or other conferencing activities including, but not limited to, chat, private rooms, polling, voting, verbal reactions, visible reactions, emoticons, or the like.

For at least one embodiment, the server conference engine 120-S may facilitate user-to-user (or private) communications, user-to-multiple user (or semi-private) communications, user-to-all (or public) communications, or otherwise during a watch party.

For at least one embodiment, the server conference engine 120-S may be configured to store user communications during a given watch party in the server data storage module 204 as conference data 204C. Such conference data may be time stamped and/or otherwise synchronized with respect to a given content segment such that a later playback of the conference data and/or the given content segment may include the conference data corresponding to such given content segment, as such conference data was generated during the given watch party. For example, a later viewing of the football program and watch party by an Nth user may include a presentation of the conference data arising between a host user device 104-1 and a second client user device 104-2 during the original watch party. Such later synchronization and presentation of conference data 204C may enable the user of the Nth client user device 104-N to enjoy the original watch party as if participating real-time even though such watch party may in fact have occurred earlier.

For at least one embodiment, a sub-conference link (not shown) may be provided as a sub-stream of the conference link 114. Data communicated over the sub-conference link may be adaptively bit-rate provided to the various users in a watch party such that each user receives a given user's reaction at substantially the same time. For example, a video camera focused upon a first user (or group thereof) may adaptively bit-rate stream images (and audio) of such first user to other second users such that the reactions of the first user, as presented to the second users are in substantially simultaneous synch with the presentation of the given content segment being presented to the first user and resulting in the given reaction. Accordingly, and for at least one embodiment, a subconference link may be configured to utilize higher speed communications links than are used to facilitate one or more of the conference links 114 such that reactions to content segments may be in substantially simultaneous synchronization with the content segment during a watch party. For at least one embodiment, subconference links and/or conference links 114 may be provided using networks supporting high band 5G communications.

Data Storage Module 204

The server data storage module 204 may be a single storage device, multiple storage devices, or otherwise. The server data storage module 204 may be configured to store user data 204A, sync data 204B, conference data 204C, and other data. The server storage device 204 may be provided locally with the sync server 102 or remotely, such as by a data storage service provided on the Cloud, and/or otherwise. Storage of data, including but not limited to user data 204A, sync data 204B, conference data 204C, and other data may be managed by a storage controller (not shown) or similar component. It is to be appreciated such storage controller manages the storing of data and may be instantiated in one or more of the server storage devices 204, the server CPU 202, on the Cloud, or otherwise. Any known or later arising storage technologies may be utilized in conjunction with an embodiment of the present disclosure to facilitate the server data storage module 204.

Available storage provided by the server data storage module 204 may be partitioned or otherwise designated by the storage controller as providing for permanent storage and temporary storage. Non-transient data, computer instructions, or other the like may be suitably stored in the server data storage module 204. As used herein, permanent storage is distinguished from temporary storage, with the latter providing a location for temporarily storing data, variables, or other instructions used for a then arising data processing operations. A non-limiting example of a temporary storage device is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store either, if not both, transient and non-transient computer instructions, and other data.

The sync server 102 may be further configured to receive and store content data 204D. For at least one embodiment, content data 204D may include segments of content for a given program. For at least one embodiment, all segments of a given content may be stored on the sync server 102, one or more user devices 104, and/or the Cloud. For at least one embodiment, a content link 112-S may be used to provide content data to the sync server 102 from a content node 106.

For at least one embodiment, a sync server 102 may include information identifying segments of content that are stored on one more user devices 104. Such content segments are referred to herein as "pre-cached content." Non-limiting examples of pre-cached content may include commercials, segments of non-live programs, or otherwise. Pre-cached content may be used by a sync server 102 to facilitate a watch party by providing ready access to content, by a given user device, when a given content link 112 is unreliable, of insufficient bandwidth, experiences undesirable latency, or otherwise. For at least one embodiment, a sync server 102 may instruct a given user device 104 to access such pre-cached content on an on-demand or otherwise basis. Such instructions may be provided, for at least one embodiment, over one or more of the sync link 110 and/or the content link 112.

Server Power Module 206

The sync server 102 may be further configured, for at least one embodiment, to include a server power module 206. The server power module 206 may include any known or later arising technologies which facilitate the use of electrical energy by a sync server 102. Non-limiting examples of such technologies include batteries, power converters, inductive charging components, line-power components, solar power components, and otherwise.

Server Security Module 208

The sync server 102 may be further configured, for at least one embodiment, to include a server security module 208. The server security module 208 may include any known or later arising security hardware components and/or computer instructions configured for use to secure content, communications regarding such content, server processes and data, and otherwise. Security components may be used to facilitate secure transmission, processing, storage and otherwise of any data used in accordance with an embodiment of the present disclosure.

Server Communications Module 210

The sync server 102 may be further configured, for at least one embodiment, to include one or more server communications modules 210. The server communications modules 210 may be configured to use any known or later arising communications and/or networking technologies which facilitate use of the communications network 108 (as further described below).

Server User Interface Module 212

The sync server 102 may be further configured, for at least one embodiment, to include a server user interface module 212. The server user interface module 212 may include any known or later arising human to device interface components, processes, and technologies. Non-limiting examples of input/output uses include audible inputs (such as spoken commands) and outputs (generated sound), visible inputs (such as eye tracking and facial recognition) and outputs (such as visible images presented on a display device, LEDs, or otherwise), touch inputs touch feedback (such as vibrations or other movements), gesture tracking, and otherwise. The server user interface module 212 may be coupled to and/or include the one or more presentation devices (not shown). The presentation devices facilitate interactions between an operator and the sync server 102.

User Device(s) 104

As discussed above, the system 100 includes two or more user devices 104-1 to 104-N including a host user device 104-1 and one or more client user devices 104-2/N. The user devices 104 may be similarly configured or may be differently configured. For at least one embodiment, any known or later arising device capable of receiving and presenting content to a user while facilitating collaboration during a watch party may be used. Non-limiting examples of user devices 104 include smartphones, laptop computers, tablet computing devices, desktop computers, smart televisions, smart glasses, virtual reality glasses, augmented reality glasses, earbuds/headphones and other audible output devices, and other devices. User devices 104 may be communicatively coupled to one or more of the content nodes 106, content sources 106, and/or servers 102 using any known or later arising communications and/or networking technologies including, but not limited to, cable systems, satellite systems, streaming audio and video system, online gaming systems, and/or other content distribution systems, on-line content distribution systems, combinations thereof, and the like.

User Device CPU 216

Figure 2B:
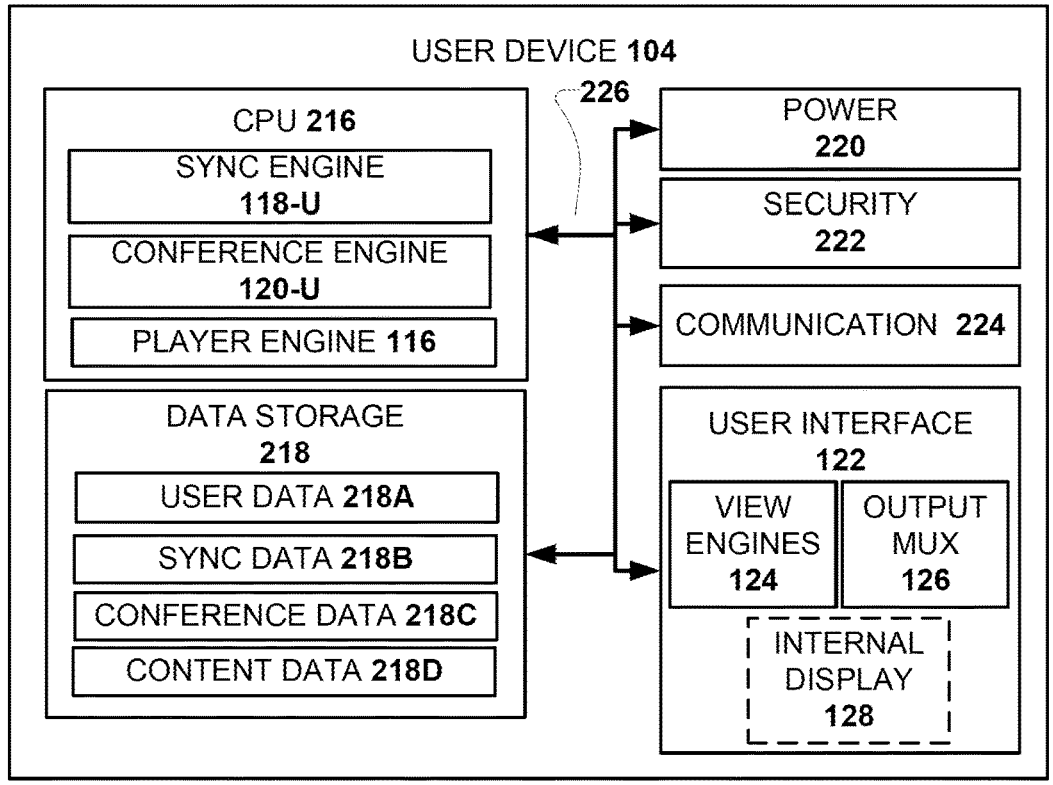
FIG. 2B is a schematic illustration of a user device configured for use in facilitating live and/or recorded content watch parties and in accordance with at least one embodiment of the present disclosure.

As shown in FIG. 2B, a user device 104 may be configured to include a user device CPU 216. The user device CPU 216 may be configured similarly to and/or have less, the same, or more of the capabilities of the server CPU 202, as described above. For purposes of conciseness only, such capabilities are not repeated here. Any know or later arising CPU technologies may be used as the user device CPU 216. The user device CPU 216 may be communicatively coupled, by a user device data bus 226 or similar structure, to other components of the user device 104 including, but not limited to, a user device data storage module 218, which may also be referred to as a "computer readable storage medium."

User Device Player 116, Sync Engine 118-U, and Conference Engine 120-U

The user device may also be configured to include one or more "engines" (as defined above) including a player 116, a user device sync engine 118-U, and a user device conference engine 120-U. One or more, if not each, of the user device sync engine 118-U and the user device conference engine 120-U may be configured to support the features and functions of the server sync engine 118-S and the server conference engine 120-S in facilitating the synchronization of content and of collaboration across user devices 104 participating in a watch party.

Client Player Engine 116

In accordance with at least one embodiment of the present disclosure, the client player engine 116 may be configured to facilitate such substantially simultaneous presentation of a given content segment by adaptively modifying one or more of the resolution, bit rate, content size, communications bandwidth utilized, communications link type used between a content node 106 and a given user device 104, or otherwise.

For at least one embodiment, the client player engine 116 may be configured to retrieve and synchronize presentation of content on a given user device 104 in order to facilitate a watch party. For such an embodiment, the client player engine 116 on each of the user devices 104 may be configured to communicate status information over the content links 112 to the content nodes 106.

For at least one embodiment, adaptive bitrate streaming sessions may be used between a given content node 106 and a given user device 104 to facilitate substantially simultaneous presentation of content during a watch party. One or more adaptive bitrate streaming technologies may be utilized by the content node 106 and a communicatively coupled thereto client player engine 116 executing on a given user device 104. Non-limiting examples of adaptive bitrate streaming technologies that may be utilized include MPEG-DASH, Adobe Systems HTTP Dynamic Streaming, Apple HTTP Live Streaming, Microsoft Smooth Streaming, and others. It is to be appreciated that by adaptively modifying the bitrate used to provide content to each user device, given content segments may be provided, decoded, and presented on each user device 104 substantially simultaneously during a watch party. For example, for a host user device 104-1 communicatively coupled to the first content node 106-1 using a 100 Mb/s connection, the first content node 106-1 and/or first content link 112-1 may be configured to provide a given content segment at a 4K resolution. Further and for a second client user device 104-2 communicatively coupled to a second content node 106-2 using only a 15 Mb/s connection, the second content node 106-2 and/or second content link 112-2 may be configured to provide the given content segment at a 720 p resolution to the second client user device 104-2. By providing the given content segment at the lower resolution it is to be appreciated that the reception and presentation of such content may occur substantially simultaneously (assuming user device content processing times are equal) on each of the host client device 104-1 and the second client user device 104-2.

Further, given that processing times for user devices 104 for given content segments may vary, a client player engine 116 may be used in conjunction with a corresponding user device sync engine 118-U to determine one or more characteristics of content reception by the given user device 104, such as bandwidth, latency, resolution, and the like. Such user device content characteristics may be suitably stored as content data 218D and in the user device data storage module 218. User data 218A may also be accessed by the player engine 116 in determining one or more characteristics of content information to be received from a given content source for a given user device.

User Device Sync Engine 118-U

For at least one embodiment, a user device sync engine 118-U may be configured to manage synchronization of content during a live and/or recorded content watch party and while such content is provided separately by given content nodes 106-1/2/N to respective user devices 104-1/2/N. Status information regarding the communication of content from a content node 106 to a user device 104 may be provided by the sync server 102 and server sync engine 118-S using the two or more sync links 110-1/2/N to each user device sync engine 118-U.

For at least one embodiment, the user device sync engine 118-U may be configured to cooperate with the server sync engine 118-S to facilitate synchronization of content during a watch party by accepting a designation of a given user device 104 as a "host" user device 104-1 or as a client user device 104-2/N. For at least one embodiment, each user device may be configurable to function as a host or a client. For at least one embodiment, a user device sync engine 118-U may be configured to limit a user device's 104 capabilities and functions to being one or the other of a host or a client during a given watch party, all watch parties, or any watch party. For example, a given user device associated with a parent of a household may be configured to function as a host or a client, while a given user device associated with a child in that household may be configured to function solely as a client for any watch party.

For at least one embodiment, the user device sync engine 118-U may be configured such that upon initiating a watch party that user device is automatically designated as the host user device 104-1 for the given watch party. For other embodiments, the user device sync engine 118-U may be configured such that a given user device 104 participating in a given watch party may be designated as the host at any time during the watch party. Such designation may occur, for example, when the user device 104 seeks to seize control of the watch party for any or no reason. For example, a parent may seek to seize control of a watch party and become the host thereof when collaboration occurring during the watch party includes inappropriate content.

For at least one embodiment, the user device sync engine 118-U for the host user device 104-1 may be configured to designate another user device, such as client user device 104-2, as the host, such as when a prior host is no longer participating in a given watch party, or as otherwise needed.

For at least one embodiment, only one user device 104 is designated as the host at any given time during a watch party, with all other user devices being designated as clients. User device sync engines 118-U in each participating user device 104 may be configured to reflect the then arising status of a given user device 104.

For at least one embodiment, the user device sync engine 118-U may be configured to facilitate synchronize a presentation of the content on all user devices 104 by providing "content timing information" to the server sync engine 118-S. For at least one embodiment, content timing information is provided solely to the server sync engine 118-S by the user device sync engine 118-U executing on the designated host user device 104-1. For at least one embodiment, content timing information is provided to the server sync engine 118-S and each client user device 104-2/N by the user device sync engine 118-U executing on the designated host user device 104-1. For at least one embodiment, content timing information is provided to the server sync engine 118-S by corresponding user device sync engines 118-U executing on each of the host and client user devices 104-1/2/N. Content timing information may be provided by a given user device 104 to the sync server 102 and/or any other user device 104 participating in a given watch party on any desired basis, periodicity, or otherwise.

For at least one embodiment, client user device sync engines 118-U may be configured to periodically receive content timing information for the host user device 104-1 from the sync server 102.

For at least one embodiment, the user device sync engine 118-U may be configured to facilitate use of one or more trick-play modes during a watch party. For at least one embodiment, trick-play modes (when supported for a given content) may be requested, via the user device sync engine 118-U, by a client user device 104-2/N for approval of and selected by the host user device 104-1. For at least one embodiment, a trick-play mode selected by the host user device 104-1 is communicated by the user device sync engine 118-U executing thereon and to the server sync engine 118-S, which further communicates such selected trick-play mode to the corresponding user device sync engine 118-U executing on each client user device 104-2/N participating in the given watch party.

For at least one embodiment, a communication of a selected trick-play mode by a host user device 104-1 to the server sync engine 118-S and thereon may include content timing information specifying a start location for the selected trick-play mode, an identification of the type of trick-play mode selected, and (where appropriate) an end UTC location specifying where normal play mode is to resume, and/or other information useful in facilitating implementation of the selected trick-play mode by each of the client user devices 104-2/N participating in the given watch party. The user device sync engine 11-U may be configured to capture the information needed to facilitate trick-play modes across one or more, if not all, client user devices 104-2/N participating in a given watch party.

For at least one embodiment, a user device sync engine 118-U may be configured to modify trick-play instructions, as received from a host user device 104-1 and via the sync server 102. Such modified trick-play instructions may be unique for the given client user device. It is to be appreciated that modifications of trick-play instructions, may be in view of and/or based upon client content timing information generated by the given client user device 104-2/N. Such client content timing information may be indicative of synchronization issues a given client user device has been experiencing during a given watch party, such as repeatedly receiving the given content at a faster or slower rate than occurs with respect to the host user device 104-1 and adjustments made by the user device sync engine 118-U independently or based upon adjustment instructions received from the server sync engine 118-S.

For at least one embodiment, a given client user device sync engine 118-U may be configured such that a given content segment, as communicated to the given client user 104-2/N, occurs such that any latency, user device delays, and/or other issues arising with the communication, processing, and/or presenting of a given portion of the content by the given client user device are addressed (if addressable) such that the presentation of future arising given content segments by that client user device 104-2/N occurs substantially simultaneously with the presentation of the future content by the host client user device 104-1. For at least one embodiment, the server sync engine 118-S may be configured to facilitate synchronization of content by each user device sync engine 118-U such that presentation of future content occurs substantially simultaneously across all user devices 104-1/2/N participating in a given watch party.

For at least one embodiment, the user device sync engine 118-U may be configured such that adjustments to presentations of content by client user devices 104-2/N, in view of content timing information provided by the host user device 104-1, occurs such that the presentation of such content by the client user device(s) 104-2/N is at one or more of a preferred quality setting, a minimum quality setting, a maximum quality setting, or otherwise.

For at least one embodiment, when a specified quality setting is not achievable, at a given time and/or over a given period, by a given wayward client device, the user device sync engine 118-U for such wayward client device may be configured to take corrective actions until such desired quality settings can be realized by the wayward client device. Non-limiting examples of such corrective actions include: pausing, by the wayward client device itself, a presenting of the content; instructing the content node 106-2/N communicatively coupled to the wayward client device to fast forward, slow down, pause, or other modify how content is provided to the wayward client device; identifying an alternative content link to another content node 106 configurable to provide content to the wayward client device at a desired download speed, quality, and/or the like; disabling sharing of reactions, in one or more formats (such as audio and video), to and/or from one or more user devices with respect to the wayward client device; providing an option to a user of the wayward client device to accept a different quality level; dropping the wayward client device from the watch party; or taking other corrective actions.

For at least one embodiment, a user device sync engine 118-U may be configured to use user device sync data 218B including, but not limited to, content timing information including, but not limited to, fast-play, slow-play and other sync options, provided by one or more user devices 104-1/2/N. User device sync data 204B may include all, a subset of, additional, different, or the same data and/or computer instructions used to facilitate synchronization of content presentation during a watch party as provided in the server sync data 204B. Non-limiting examples of user device sync data 218B may also include communications sockets used by user devices to connect with a content provider 105 and/or a content node 106-1/2/N, IP addresses for user devices, user device identifiers, such as MAC addresses, communications network settings used for one or more of the content links 112-1/2/N, sync links 110-1/2/N, available buffer and/or storage, and otherwise. For at least one embodiment, the user device sync engine 118-U may be configured to use user device user data 218A to a facilitate synchronization of content during a watch party. User device user data 218A may include all, a subset of, additional, different, or the same data and/or computer instructions used to facilitate synchronization of content presentation during a watch party as provided in the server user data 204A. Non-limiting examples of user device user data 2184A include user demographic information, user device information such as capabilities, technologies supported, and the like, user preferences, user viewing histories, and the like.

User Device Conference Engine 120-U

For at least one embodiment, a user device conference engine 120-U may be configured to facilitate collaboration by and between users, via their respective user devices 104, during a watch party, and using the two or more conference links 114-1/2/N established with the sync server 102.

For at least one embodiment, synchronization of and collaboration by and between users (via their respective user devices 104) during a given watch party may be decoupled from one or more of a providing of content (by the content nodes 106 to the user devices 104) and/or any synchronization of content presentation, as facilitated by the user device conference engine 120-U in cooperation with the server conference engine 120-S.

For at least one embodiment, the user device conference engine 120-U may be configured to provide of reactions of a given user with the sync server 102 independently of other watch party elements.

For at least one embodiment, the user device conference engine 120-U may be configured to support collaboration between users in any humanly perceptible format; non-limiting examples including speech, video, text, emoticons, gestures, or otherwise. For at least one embodiment, the conference links 114-1/2/N and collaborative aspects of a watch party may be established or unestablished at any time before, during, or after a given watch party.

For at least one embodiment, the user device conference engine 120-U may be configured to leverage proprietary, custom, open source, or otherwise provided conferencing software applications including, but not limited to, JITSI MEET, WEBEX, ZOOM, and otherwise.

For at least one embodiment, the user device conference engine 120-U may be configured to utilize user device conference data 218C. User device sync conference data 218C may include all, a subset of, additional, different, or the same data and/or computer instructions used to facilitate synchronization of content presentation during a watch party as provided in the server conference data 204C. User device conference data 218C may include any data and/or computer instructions which facilitate collaboration during a watch party. Non-limiting examples of user device conference data 218C include communications sockets used by user devices, IP addresses for user devices, user device identifiers, such as MAC addresses, communications network settings used for one or more conference links 114-1/2/N and otherwise. For at least one embodiment, the user device conference engine 120-U may be configured to use user data 218A to a facilitate collaboration during a watch party.

Further, various user device conference data 218C may be stored in the user device storage device 218A and used by the user device conference engine 120-U in facilitating collaboration during a watch party. Non-limiting examples of such user device conference data 218C include type of connection, distance of user device 104 from sync server 102, maximum available bandwidth for a given conference link 114-1/2/N, throughput for the conference link 114, latency, and other data. User device conference data 218C may be provided for each conference link 114-1/2/N used during a watch party.

For at least one embodiment, the user device conference engine 120-U may be configured to facilitate any desired singular or combination of voice, video, web, or other conferencing activities including, but not limited to, chat, private rooms, polling, voting, verbal reactions, visible reactions, emoticons, or the like.

For at least one embodiment, the user device conference engine 120-U may facilitate user-to-user (or private) communications, user-to-multiple user (or semi-private) communications, user-to-all (or public) communications, or otherwise during a watch party.

For at least one embodiment, the user device conference engine 120-U may be configured to store user communications during a given watch party in the user device data storage module 218 as user device conference data 218C. Such user device conference data 218C may be time stamped and/or otherwise synchronized with respect to a given content segment such that a later playback of the conference data and/or the given content segment may include the conference data corresponding to such given content segment, as such conference data was generated during the given watch party. For example, a later viewing of the football program and watch party by a use of the given user device 104 may include a presentation of the conference data arising during the original watch party. Such later synchronization and presentation of user device conference data 218C may enable the user of the given client user device to again enjoy the original watch party as if participating real-time even though such watch party may in fact have occurred earlier.

User Device Power Module 220

The user devices 104 may be further configured, for at least one embodiment, to include a user device power module 220. The user device power module 220 may include any known or later arising technologies which facilitate the use of electrical energy by a user device 104. Non-limiting examples of such technologies include batteries, power converters, inductive charging components, line-power components, solar power components, and otherwise.

User Device Security Module 222

The user devices 104 may be further configured, for at least one embodiment, to include a user device security module 222. The user device security module 222 may include any known or later arising security hardware components and/or computer instructions configured for use to secure content, communications regarding such content, user device processes and data, and otherwise. Security components may be used to facilitate secure transmission, processing, storage and otherwise of any data used in accordance with an embodiment of the present disclosure.

User Device Communications Module 224

The user devices 104 may be further configured, for at least one embodiment, to include one or more user device communications modules 224. The user device communications modules 224 may be configured to use any known or later arising communications and/or networking technologies which facilitate use of the communications network 108 (as further described below).

User Device User Interface Module 122

The user devices 104 may be further configured, for at least one embodiment, to include a user devices user interface module 122. The user devices user interface module 122 may include any known or later arising human to device interface components, processes, and technologies. Non-limiting examples of input/output uses include audible inputs (such as spoken commands) and outputs (generated sound), visible inputs (such as eye tracking and facial recognition) and outputs (such as visible images presented on a display device, LEDs, or otherwise), touch inputs touch feedback (such as vibrations or other movements), gesture tracking, and otherwise. The user devices user interface module 122 may be coupled to and/or include the one or more presentation devices (not shown). The presentation devices facilitate interactions between a user and a given user device 104.

For at least one embodiment, the user device user interface module 122 may be configured to include one or more view engines 124. A view engine 124 is an "engine" (as defined above) which facilitates the presentation of content from a given view or perspective. For at least one embodiment, a view engine 124 for a given user device facilitates the presentation of collaboration information as received by the given user device from the sync server 102. For at least one embodiment, collaboration information presented by a view engine 124 for a first user device, such as a host 104-1 may be the same or different than collaboration information presented by a view engine 124 for a given client user device 104-2/N.

For at least one embodiment, a user device user interface module 122 may be configured to include an output multiplexer (mux) 126. For at least one embodiment, the output mux 126 may be provided as an "engine" (as defined above). The output mux 126 may be configured to combine collaboration data received from the sync server 102 with content data received from a content node 106 and output an integrated presentation of the content and collaboration data. For at least one embodiment, the output mux 126 may be configured to modify or adapt the integrated presentation based upon one or more characteristic of the content data and/or the collaboration data. For example, the output mux 126 may be configured to mute and/or decrease the volume of content audio when the collaboration data includes spoken audio by a user of a client device 104. More specifically and for at least one embodiment, the output mux 126 may be configured to receive an input signal from a user input device, such as a keyboard, button, detected gesture, or the like indicative that a user of the given user device desires to provide spoken collaboration information to other users during the watch party. In response to such input, the output mux 126 may be configured to mute content audio while the user provides the spoken collaboration.

Similarly, and for at least one embodiment, other properties of a given content, such as video content properties, may be adjusted by the output mux 126 when collaboration information is being provided by a user and such collaboration information may conflict with or otherwise be given priority and/or precedence over the then arising content information. For example, content video information may be dimmed, diminished in brightness, diminished in sizing, resolution, or otherwise when video collaboration information is desired to be provided. Such video collaboration information may be identified as having a higher priority than the content information by a user of a user device configured to provides such prioritization to the collaboration information, such as, but not limited to, a host user device. For example, a watch party that includes an unexpected marriage proposal may be configured to provide priority or other emphasis to the collaboration information capturing the wedding proposal over the otherwise arising content information.

As further shown in FIG. 2B, the user device user interface 122 may include an internal output device 128. The internal output device 128 may include any singular or combination of devices configured to provide in whole or in part, one or more of content information and collaboration information. Non-limiting examples of internal output devices 128 includes display screens or panels, speakers, vibrational elements, lights, and the like.

As further shown in FIG. 1, a user device, such as the second user device 104-2, may be communicatively coupled to an external output device 132-2 to provide conference information for presentation using an internal output device 128-2, and, via use of an intermediary device such as a 10-Foot device 130-2, content information on an external output device 132-2, where the content information is received from a content node 106-2 coupled to a 10-Foot device 130-2 via a separate content link 112-2B. As shown, a separate content link 112-2A may also be used between the content source 106-2 and the user device 104-2, as desired for any given embodiment. The second user device sync engine 118-2 may be configured to control the 10-Foot device 130-2 and presentation of the content information received from the content node 106-2 such that the content information may be synchronized with the conference information presented on the internal output device 128-2. For at least one embodiment, both the content information and the conference information may be presented on the external output device 132-2 such as by use of an overlay, separate windows, multi-picture, picture-in-picture, or otherwise. For at least one embodiment, the 10-Foot device 130-2 may be configured to receive each of the content information and the conference information from the respective content node 106-2 and user device conference engine 120-2, combine the received information in a combined output information, and provide the combined output information for presentation to a user via the external output device 130-2. It is to be appreciated that the combined output information may utilize any desired display formatting, such as, but not limited to, windowing, overlays, picture-in-picture, or otherwise.

For at least one embodiment, a user device user interface 122 may be configured to include one or more of an audio input/output (I/O) module, a visual I/O module, a text I/O module, a gesture I/O module and/or other interface modules. Various non-limiting features and functions of such I/O modules are described herein.

Audio I/O Module: Audio I/O modules may be configured to support the providing of audible signals between a user and a user device. Such audio signals may include spoken text, sounds, or any other audible information. Such audible information may include one or more of humanly perceptible audio signals, where humanly perceptible audio signals typically arise between 20 Hz and 20 KHz. For at least one embodiment, the range of humanly perceptible audio signals may be configurable to support an audible range of a given individual user.

For at least one embodiment, an audio I/O module generally includes hardware and computer instructions (herein, "audio technologies") which supports the input and (as desired) output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. Non-limiting examples of audio technologies that may be utilized in an audio I/O module include GOOGLE VOICE, SFTRANSCRIPTION, BRIGHTSCRIPT, GOOGLE ASSISTANT, SIRI, and others.

In at least one embodiment, an audio I/O module may be configured to use one or more microphones and speakers to capture and present audible information to user. Such one or more microphones and speakers may be provided by a given user device itself or by a device communicatively couple additional audible device component, for example, by earbuds may be communicatively coupled to a smartphone, with the earbuds functioning as an audio I/O module and capturing and presenting audio sounds to and from a user, while the smartphone functions as a user device. Accordingly, it is to be appreciated that any existing or future arising audio I/O devices, systems and/or components may be utilized by and/or in conjunction with a user device to facilitate communications within an internal net and/or for communication over an external net. In at least one embodiment of the present disclosure, users provide their comments audibly for presentation to other users on an internal net and/or on an external net and receive representations of other user's comments also audibly.

For at least one embodiment, an audio I/O module may be configured to automatically recognize and capture comments spoken by a user and intended for sharing with other users during the watch party. Such identification may occur as a default setting of the audio I/O module into a "capture" mode, based upon analysis and recognition of spoken comments as being intended for one or more second users attending the watch party. For example, a comment such as, "Go CHIEFS," where "CHIEFS" refers to an NFL football team participating in a game being presented during the watch party, may be automatically captured, and shared by an audio I/O module with other users during the watch party. The analysis and determination of which captured sounds to share with select if not all users during a watch party may be accomplished by execution of corresponding computer instructions by one or more of a user device conference engine 120-U, a user device user interface 122, and/or in conjunction with computer instructions executed by a server conference engine 120-S.

Further, the audio I/O module, in cooperation with one or more of other system components including but not limited to one or more of the user device conference engine 120-U, the user device CPU 216, the server conference engine 120-S and otherwise may be configured to apply machine learning and/or artificial intelligence processes to spoken utterances of one or more users of a host user device and/or a client user device participating in a given watch party. For example, a first utterance, such as "Wow, I can't believe how many TDs Patrick Mahomes has today", may be configured to be recognized by the system and produce a given action (such as re-presenting the most recent touchdown), whereas a second utterance, such as "Von Miller just intercepted Mahomes, that's going to hurt your fantasy team this week" might result in a different, second action, such as a presenting of a fantasy scoreboard, linking to and/or presenting information from a fantasy sports website, or otherwise.

For at least one embodiment, a priming key word, such as "Hey <user name>" may also and/or alternatively be used to designate which audio comments, by a first user, are to be shared solely with one more second users during a watch party. While the use of priming key words are supported, for at least one embodiment, the system 100 may be configured to automatically recognize and share users' comments during a watch party on a broadcast to all participating user devices, a multicast to a group of participating user devices, as a private communication to one user device, or otherwise.

Visual I/O Module: For at least one embodiment, a user device 104 may include a visual I/O module configured to support the providing of visible signals between user devices during a watch party. Such visible signals may be in any desired form, such as still images, motion images, augmented reality images, virtual reality images, and otherwise. Such visible information may include one or more of humanly perceptible visible signals. For at least one embodiment, a visual I/O module may also be configured to capture non-humanly visible images, such as those arising in the X-ray, ultra-violet, infra-red or other spectrum ranges. Such non-humanly visible images may be converted, as desired, into humanly visibly perceptible images by a user device.

For at least one embodiment, a visual I/O module generally includes hardware and computer instructions (herein, "visible technologies") which supports the input by and (as desired) output of visible signals to other user devices during a watch party. Such visible technologies may include technologies for converting images (in any spectrum range) into humanly perceptible images, converting content of visible images into a given user's perceptible content, such as by character recognition, translation, playback rate adjustment, playback frequency adjustment, and otherwise.

A visual I/O module may be configured to use one or more display devices configured to present visible information to user. A visual I/O module may be configured to use one or more image capture devices, such as those provided by lenses, digital image capture and processing software and the like which may be provided by a given user device itself or by a communicatively coupled additional image capture device component, for example, a remote camera in a vehicle or otherwise. Accordingly, it is to be appreciated that any existing or future arising visual I/O devices, systems and/or components may be utilized by and/or in conjunction with a user device to facilitate the capture, communication and/or presentation of visual information in conjunction with a watch party.

In at least one embodiment of the present disclosure, during a watch party users may provide their comments visibly for presentation to other users and receive representations of other user's comments visibly. As discussed above with regard to audible comments, such visible comments may be captured automatically, upon use of one or more priming key images, or otherwise.

For at least one embodiment, visible technologies may be used to generate virtual reality representations of a given content experience, for example, an NFL football game. For example and not by limitation, a given host user may be represented in a virtual reality experience, e.g., in a virtual representation of a given stadium, as being seated next to one or more guest users, with all such users being communicatively coupled via a given watch party. For such an embodiment, one or more audio technologies may be used to provide, mute, or otherwise present stadium noise, emphasize guest utterances over other's utterances, or otherwise. Such a virtual experience may be initiated by a given initiating user, such as the NFL or a team thereof, with a "season ticket holder" being designated as a "host" with respect to one or more virtual seats—with the one or more virtual seats being virtually occupied by a guest user, or a designee thereof. It is to be appreciated that the guest user, or designee thereof, may or may not be personally known to the host, for example, as may arise when a guest "seat" is transferred via a ticketing transfer platform, such as STUBHUB or the like.

Text I/O Module: For at least one embodiment, a user device 104 may include a text I/O module configured to support the providing of textual information input by a user using a user device 104. Such textual information signals may be in any desired language, format, character set, or otherwise. Such textual information may include one or more of humanly perceptible characters, such as letters of the alphabet or otherwise. For at least one embodiment, a text I/O module may also be configured to capture textual information in first form, such as a first language, and convert such textual information into a second form, such as a second language.

A text I/O module generally includes hardware and computer instructions (herein, "textual technologies") which supports the input by and (as desired) output of textual information signals to a user. Such textual technologies may include technologies for inputting, outputting, and converting textual content into a given user's perceptible content, such as by character recognition, translation, size/font adjustment, and otherwise. In at least one embodiment, a text I/O module may be configured to use an input device, such as a keyboard, touch pad, mouse, or other device to capture textual information. It is to be appreciated that any existing or future arising text I/O devices, systems and/or components may be utilized by and/or in conjunction with a user device 104 to facilitate the use of textual information for dissemination to other user devices 104 during a watch party. In at least one embodiment of the present disclosure, during a watch party users may provide their comments textually for presentation to other users and receive representations of other user's comments textually. As discussed above with regard to audible comments, such textual comments may be captured automatically, upon use of one or more priming key words or textual characters or strings thereof (e.g., the depressing of a "comment" button being indicative that a following string of characters are intended as comments for the user circle), or otherwise.

Gesture I/O Module: For at least one embodiment, a user device 104 may include a gesture I/O module configured to support the providing of gesture information, such as sign language, by a user using a user device. Such gesture information signals may be in any desired form or format. Such gesture information may include one or more of humanly perceptible characters, such as those provided by sign language. For at least one embodiment, a gesture I/O module may also be configured to capture a user's motions to control one or more aspects of a user device, examples of such motions including those commonly used on smartphone touch interfaces.

A gesture I/O module generally includes hardware and computer instructions (herein, "gesture technologies") which supports the input by and (as desired) output of gesture information signals to a user, via user devices 104 and during a watch party. Such gesture technologies may include technologies for inputting, outputting, and converting gesture content into any given form, such as into textual information, audible information, visual information, device instructions or otherwise. In at least one embodiment, a gesture I/O module may be configured to use an input device, such as a motion detecting camera, touch pad, mouse, motion sensors, or other devices configured to capture motion information.

It is to be appreciated that any existing or future arising gesture I/O devices, systems and/or components may be utilized by and/or in conjunction with a user device 104 to facilitate the use of and communication of gesture information to user devices 104 during a watch party. In at least one embodiment of the present disclosure, during a watch party users may provide one or more of their comments via gestures for presentation to other users and receive representations of other user's comments in a second desired format, such as audibly, visually, via characters, or otherwise. Thus, it is to be appreciated that the various embodiments of the present disclosure may be configured to use one or more of the described above and/or other I/O devices to facilitate user collaboration during a watch party. Such I/O devices may be used individually or in any desired combination thereof. As discussed above with regard to audible comments, such gesture comments may be captured automatically, upon use of one or more priming key gestures (e.g., the waving of one's hand in a certain manner, or nodding or shaking one's head), or otherwise.

Content Sources 107

For at least one embodiment, the system 100 may include one or more content sources 107 communicatively coupled to one or more content providers 105, which facilitate the providing of content information to user devices via one or more content nodes 106. One or more if not each of the content sources 107, content providers 105 and/or content nodes 106 may be similarly configured to the sync server 102 and include one or more processors, data storage components, user interface components, security components, communications, and location components. The characteristics and capabilities of such components are well known in the art and one or more of such components may be configured to execute computer instructions which facilitate watch parties in accordance with at least one embodiment.

Network 108

For at least one embodiment, the system 100 includes a communications network 108 that communicatively couples each user device 104 with the sync server 102 and communicatively couples content node(s) 106 with user devices 104 and, for at least one embodiment, the server 106. The communications network 108 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. For at least one embodiment, the communications network 108 may utilize mid-band and/or high band 5G communications frequencies. As is commonly known and appreciated, mid-band 5G communications frequencies typically support communications of 100-400 Mb/s download and are typically deployed over 2.4 GHz to 4.2 GHz frequencies. Likewise, high band 5G communications frequencies typically support communications of 1-2 Gb/s download and are typically deployed over 24-72 GHz frequencies. For at least one embodiment, one or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

As shown in FIG. 1, one or more communications links may be established between a user device 104 and content node 106 and between a user device 104 and the sync server 102. It is to be appreciated that any combination of communications links, including each of the communications links, may be combined or provided as single, multiple, or other combinations of communication links for at least one embodiment of the present disclosure. Accordingly, it is to be appreciated that the communications links are described herein for purposes of functional explanation only and are not limited to any particular physical configurations.

More specifically, each user device 104 may establish a sync link 110-1/2/N with the sync server 102. For at least one embodiment, the sync link 110 may be used to facilitate communication of timing, status, and other synchronization information by and between a given user device 104 and the sync server 102.

As further shown in FIG. 1, each user device 104 may establish a content link 112-1/2/N with a given content node 106. For at least one embodiment, the content link 112 may be used to facilitate communication of content information by the content node 106 to the user device 104. While depicted in FIG. 1 as a unidirectional link, it is to be appreciated that when a given user device 104 also functions as a content source, the content link 112 may be reversed between that given user device functions as both a content source and a content recipient.

As further shown in FIG. 1, one or more, including but not limited to each, user device 104 may establish a conference link 114-1/2/N with the sync server 102. For at least one embodiment, the conference link 114 may be used to facilitate bi-directional communication of one or more users' reactions to a given content during a watch party. For at least one embodiment, reactions captured by only a given user device may be shared during a watch party. For another embodiment, reactions captured by permitted user devices may be shared during a watch party. For another embodiment, reactions captured by any user device may be shared during a watch party. For at least one embodiment, a user's reactions during a watch party may be communicated to the sync server 102 using the conference link 114 and redistributed to the other users using respective conference links 112 established therebetween. For example, audio and/or video of a user's reaction may be communicated over respective conference links 114 to other users while content information is communicated over respective content links 112 such that the combined information may be presented using an output device in a picture-in-picture, overlay, separate audio channel, mixed audio channel, text message stream, closed captioning stream, or otherwise.

It is to be appreciated that such "reactions" may be communicated using the system 100 in separate data streams, such as separate MPEG, AAC, or other audio and/or video streams. Each user device 104 and/or the sync server 102 may be configured to mix, present, or otherwise process reactions in accordance with preferences of a given user, based upon a default setting, or otherwise.

For at least one embodiment, one or more of the sync server 102, a transmitting user device 104 and/or a receiving user device 104 may be configured to transform reactions provided by a given user into an audible, visual, grammatical, phonetic, language, or other format preferred by another user. For example, audible reactions in the Spanish language may be translated into the English language. Similarly, audible reactions may be converted to text for hearing impaired users and physical reactions (such as clapping or the like) may be converted to descriptive text for visually impaired users. Other reactions may be converted as desired for any given embodiment. For at least one embodiment, Cloud based resources may be used for reaction conversions.

As shown in FIGS. 3A to 3E, one or more operations may be used in accordance with an embodiment of the present disclosure to facilitate live and/or recorded content watch parties. Such operations are identified in a numerical sequence for purposes of clarity and identification only and is not used herein to infer that a given operation need occur before, after, in conjunction with, separately, or otherwise of any other operation.

More specifically and for at least one embodiment, a process for facilitating live and/or recorded content watch parties may generally include one or more operations including: forming the watch party whereby multiple user devices are invited to attend (and, as appropriate, accept) the watch party by a host user device; Identifying and obtaining access to the content from one or more content sources 107, such as via content providers 105 and/or content nodes 106; associating a UTC time with a given portion of content at each of a host user device 104-1 and one or more client user devices 104-2/N participating in the watch party; communicating the host time stamped content portion information to the sync server 102 and/or each client user device 104-2/N; determining by one or more of the sync server 102 and/or each client user device 104-2/N any difference (delay) between the host time stamp for the given portion of content information and each given client user device's time stamping of such given portion; and adjusting a presentation of one or more future arising portions of the content information based on the determined delay (if any). It is to be appreciated, that such determined delay (if any) may results in the adjusting of a future presentation by a given client user device by use of one or more trick-mode operations, such as, fast forwarding, skipping, or pausing a presentation of the content during the watch party.

More specifically and with respect to at least one embodiment of the present disclosure, a process for facilitating live and/or recorded content watch parties may include one or more of operations 3002 thru 3138, as shown in FIGS. 3A to 3E.

As per Operation 3002, the process may include initializing a first user device 104-1 as a "host" for a given watch party. For discussion purposes only herein, the "first user device" and the "host" are used interchangeably. As discussed above, any given user device may be a host. For at least one embodiment, only a single host is designated, at any given time, during a given watch party. Two or more user devices may be designated, as each being a host, during different portions of a watch party.

For at least one embodiment, a host 104-1 may specify to the sync server 102 the content to be presented during a watch party, when the watch party is to occur, when the watch party ends, who may collaborate, minimum quality levels, and any other conditions and/or terms of the watch party. Initialization may include one or more communications between the host 104-1 and the sync server 102. For at least one embodiment, such communications may arise using a first sync link 110-1.

Per Operation 3003, the process may include initializing the sync server 102 for the watch party. Server initialization may include those operations needed to facilitate use of the server sync engine 118-S, the server conference engine 120-S, and the eventual establishment of sync links 110 and conference links 114 between the host user device 104-1 and the sync server 102.

Per Operation 3004, the process may include the host 104-1 identifying one or more second users to invite to the watch party. Such one more identified second users may include all users, such as for a public watch party, or a selection of users, such as those specifically known to the host user. Such selected second users may include users then known or unknown to the host user device 104-1. For at least one embodiment, user data 204A maintained by the sync server 102 may be used in identifying one or more second users to be invited to the watch party.

Per Operation 306, the process may include the sync server 102: receiving from the host user device 104-1 an identification of the second users to invite to the watch party; and communicating an invite to a second, client user device 104-2/N associated with each identified user. For at least one embodiment, each invite may be communicated using one or more sync links 110-2/N between the sync server 102 and each invited client user device 104-2/N. For at least one embodiment, a common sync link 110 may be utilized to send the invite to eh second, client user devices 104-2/N. For at least one embodiment, a unique sync link 110-2/N may be used between the sync server 102 and each invited second, client user device 104-2/N. For at least one embodiment, user data 204A may be used to identify second, client user devices 104-2/N to which the invite is to be communicated. Any known or later arising communications method may be used to communicate the invite to the second, client user devices 104-2/N. For at least one embodiment, the invite may be communicated directly by the host user device 104-1 to the one or more second, client user devices 104-2/N and without use of the sync server 102.

Per Operation 3008, the process may include one or more of the invited second, client user devices 104-2/N accepting the invitation to attend the watch party. It is to be appreciated that an acceptance, declining, or disregarding (without a reply) of the invitation may occur for any reason. It is also to be appreciated that the invitation may be for a currently arising watch party or a future arising watch party; acceptance of such invitation may occur in view of the timing of the watch party event. For at least one embodiment, an invited second, client user device 104-2/N is deemed to decline an invitation unless an acceptance is communicated within a given period to sender of the invitation such as the sync server 102 and/or the host user device 104-1 (as the case may be).

As further shown, communication of an acceptance of the invitation to attend the watch party may include a sending of an acceptance communication (a "participation list") from the server to the host user device 104-1. Such participation list may identify one or more, if not all, second, client user devices 104-2/N accepting the invitation. For at least one embodiment, the acceptance operations may include those accepting invited devices communicating, to the sync server 102 one or more communications parameters to be utilized for one or more of the sync link 110-2/N and/or conference link 114-2/N between the sync server 102 and the accepting user device 104-2/N. Such communications parameters may include, without limitation, a network to utilize (such as, a LAN, WIFI, cellular, 5G or other network), maximum bandwidth allowed, minimum bandwidth, security protocols, or otherwise. The participant list may include one or more identifications of the user devices that will be participating in the watch party, capabilities of participating user devices, communications parameters to use, minimum bandwidths of user devices, users associated with a given participating user device, and other information. Participant list information may be used by the sync server 102 in facilitating the watch party, such as by ensuring minimum bandwidth requirements are satisfied, or other action is taken when not satisfied.

Per Operation 3010, the process may include the sync server 102 initializing the server sync engine 118-S, the server conference engine 120-S and any other components utilized to facilitate the watch party. It is to be appreciated that the server initialization may occur at any time prior to commencement of the watch party. The watch party may commence at any desired time, such as immediately, based upon an event time (such as a scheduled program time), at some time arising in advance of an event time, or otherwise.

Per Operation 3012, the process may include each user device 104-1/2/N that is to participate in the watch party establishing respective sync and conference links 114-1/2/N with the sync server 102.

Per Operation 3014, the process may include the host user device 104-1 establishing a content link 112-1 with a given content node 106-1.

Per Operation 3016, the process may include the content node 106-1 identifying by a "content ID" an identifier for the given content that the host desires to have presented during the watch party. For at least one embodiment, the content ID may identify the given content by channel, program name, episode, or otherwise.

Per Operation 3018, the process may included the host user device 104-1 communicating the content ID to the sync server 102 and, thereby, to the participating/second, client user device(s) 104-2/N. The content ID may include any parameters needed to present the content by a given user device 104-1/2/N during the watch party. Non-limiting examples of such parameters may include content identifiers, security keys, encoding formats used, and otherwise.

Figure 3A:
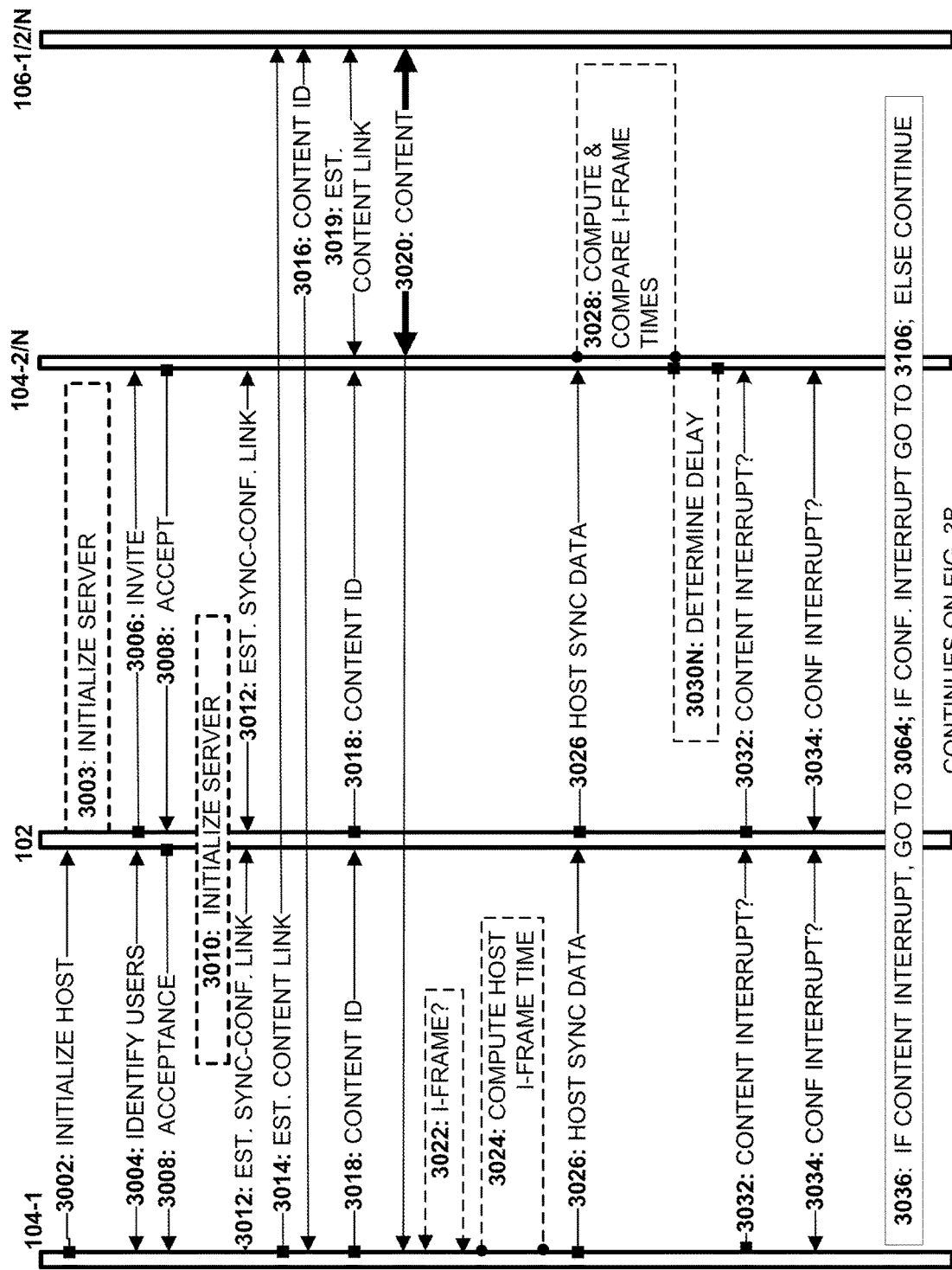
FIGS. 3A to 3E are a flow diagram illustrating a process for facilitating live and/or recorded content watch parties and in accordance with at least one embodiment of the present disclosure.

Per Operation 3019, the process may include each participating client user device 104-2/N establishing respective content links 112-2/N with respective content nodes 106-2/N that can provide the desired content, as represented by the content ID, to the given client user device 104-2/N during the watch party. As shown in FIG. 3A, the operations of establishing the second, client content links 112-2/N may occur directly between the client user devices 104-2/N and one or more content nodes 106-2/N. It is to be appreciated, however, that for at least one embodiment, content links 112-1/2/N may be established between user device 104 and contend nodes 106 via the sync server 102.

Per Operation 3020, the process may include the content node(s) 106 providing the content to the host and participating user devices 104 during the watch party. It is to be appreciated that the providing of the content may include obtaining any rights and/or other permissions needed to facilitate the watch party. For example, for a multi-user presentation right, one or more of the host user device 104-1, the sync server 102, and/or the client user devices 104-2/N may need to obtain permission in advance from a content source 107 and/or content provider 105 in order for the content to be provided to the host user device 104-1 and the one or more client user devices 104-2/N.

Per Operations 3022 and 3024 the process may include the host user device 104-1 detecting a first (or subsequent) I-frame for the content and determining for such I-frame a corresponding UTC time. For the host user device 104-1, such corresponding UTC time, and the I-frame to which it corresponds may be designated herein as the "host sync data."

Per Operation 3026, the process may include the host 104 communicating, via the sync server 102, the host sync data to each client user device 104-2/N.

Per Operation 3028 and 3030, the process may include each client user device 104-2/N extracting from the host sync data the UTC time and corresponding I-frame for the host user device 104-1, determining an UTC time at which the client user device 104-2/N is receiving a current I-frame, determining a number of I-frames received since the first I-frame, such determined I-frames being herein the "second I-frame" and determining any "delay" between a presentation of the second I-frame on the host user device 104-1 and a presentation of the second I-frame on the given client user device 104-2/N. It is to be appreciated that the second I-frame will be output by the content provider 105, via the one or more content nodes 106, to each user device 104-1/2/N in a predictable and consistent sequence of time and data packets. It is to be appreciated that the delay may be a positive number when the client user device 104-2/N is presenting a given portion of content, as represented for example by a GOP identifier, at a time that is earlier than when that same GOP is presented by the host user device 104-1. Likewise, the delay may be a negative number when the client user device 104-2/N is presenting a given portion of content (a GOP) at a time that is later than that same GOP is presented by the host user device 104-1.

Per Operations 3032, 3034, and 3036, the process may include determining whether one or more of a content interrupt or a conference interrupt has been detected. It is to be appreciated that such interrupts may occur at any time during the watch party and are identified as arising at Operations 3032, 3034 and 3036 for purposes of explanation only. As used herein and as further discussed below, a content interrupt may arise when a user device request use of a trick-play mode or the like. A conference interrupt may arise when a user device requests use of a form of collaboration that the system may be configured to adjust presentation of the content, in any given form or format, while such collaboration is occurring. For example, a user desiring to collaborate verbally may result in audio forms of the content being muted, decreased in volume, or otherwise adjusted while such verbal collaboration is occurring.

Figure 3B:
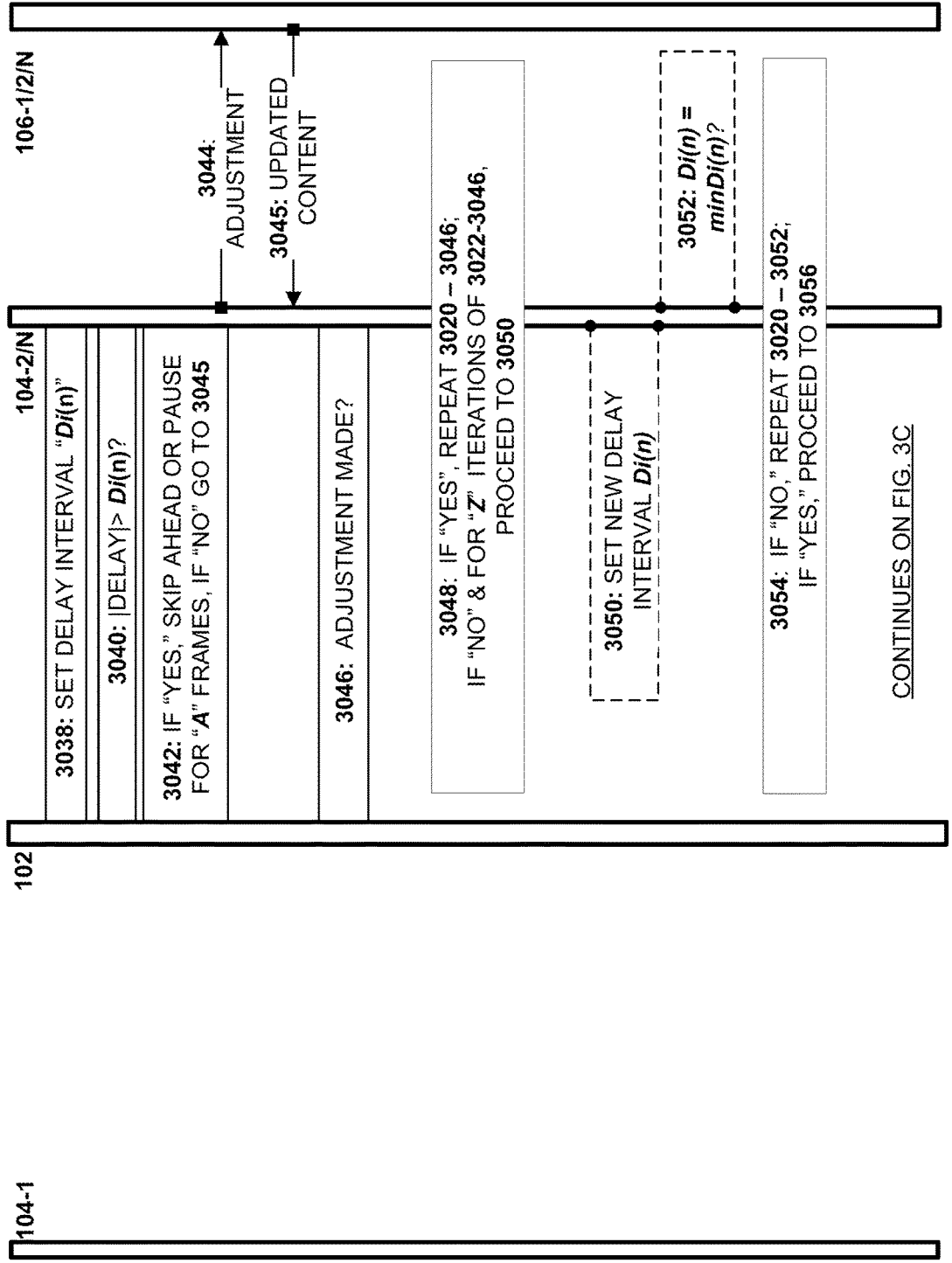

As shown in FIG. 3B and as per Operation 3038, the process may include determining a delay interval "Di", such as an initial delay interval Di(1). The initial delay interval Di(1) may be any predetermined delay interval that the sync server 102 may use in determining whether to adjust a presentation of the content by one or more client user devices 104-2/N in view of the then arising actual delay, as determined per Operation 3030. Di(1) may be set for use by one or more, if not both, of the sync server 102 and the given client user device 104-2/N. For at least one embodiment, Di(1) equals one-thousand milliseconds (1000 mS). For at least one embodiment, Di(1) may be fixed for use with one or more, if not all, subsequent determinations of whether to adjust the presentation of the content on a given client user device 104-2/N. For at least one embodiment, Di(1) may be common for all client user devices 104-2/N. For at least one embodiment, Di(1) may vary from a second client user device 104-2 to an $N^{th}$ client user device 104-N. For at least one embodiment, an identification of Di(1) for use with a given client user device 104-2/N may be determined using information determined during establishment of a given $2^{nd}$ to Nth client content link 112-2/N, and in view of one or more characteristics thereof, with a given client user device 104-2/N. For at least one embodiment, Di(1) may be further determined in view of one or more characteristics of the first, host content link 112-1, and in view of one or more characteristics thereof, established with the host user device 104-1.

Per Operations 3040 and 3042, the process may include determining whether the absolute value of the computed delay (per Operation 3030) is greater than Di(1). If "YES," then an adjustment in the presentation of the content by that given client user device 104-2/N is needed. If the delay is negative, then a skip ahead operation may be needed by the given client user device 104-2/N. If the delay is positive, then a pause or slowing of the presentation of the content may be needed by the given client user device 104-2/N. As used herein, such adjustment "A" may be based on I-frames, time, or any other designator. The adjustment "A" may be communicated by the sync server 102 to the given client user device 104-2/N. For at least one embodiment, Operations 3040-S and/or 3042-S may be performed by one or more of the server sync engine 118-S and the user device sync engine 118-U. It is to be appreciated that each adjustment "A" may vary by client user device 104-2/N and over time.

Per Operation 3043, the process may include the client user device 104-2/N communicating the adjustment "A" to their respective content node 106-2/N.

Per Operations 3044 and 3045, the process may include the given content node 106-2/N providing updated content to the given client user device 104-2/N that is reflective of the adjustments made.

Per Operations 3046 and 3048, the process may include repeating operations 3020-3046 until an adjustment is not needed for "Z" iterations, where Z is an integer. For at least one embodiment, Z is predetermined to equal five (5) GOPs. For other embodiments, other bases and integers may be used for Z. When an adjustment is not needed for Z iterations, the process proceeds to Operation 3050.

Per Operation 3050, the process may include adjusting the delay interval Di to a second delay interval Di(2) or a next delay interval, where the next delay interval is selected upon the next procession through Operation 3030. Such next delay interval may include, but is not limited to, a third delay interval Di(3), a fourth delay interval Di(4) and/or an $n^{th}$ delay interval Di(n). For at least one embodiment, the delay intervals may be governed by the mathematical relationship of: $Di(1)<Di(2)<Di(3)<Di(4)<Di(n)$. For at least one embodiment, Di(2) equals five hundred milliseconds (500 mS), Di(3) equals three hundred milliseconds (300 mS), and Di(4) equals one hundred milliseconds (100 mS). Other values may be used for other embodiments for a given Di(n).

Per Operations 3052 and 3054, the process may include repeating operations 3020-3052, while adjusting Di(n), until Di(n) equals a minimum delay interval "minDi(n)"—which may be an integer and may be predetermined. The process then continues with Operation 3056 on FIG. 3C.

Per Operations 3056, 3058, 3060 and 3062, the process may include determining whether a current I-frame for the host user device 104-1 is within approximately the same as the current I-frame for the given client user device 104-2/N. For at least one embodiment, approximately equal may be determined based on minDi(n). If the determination is "YES," then no adjustment is needed and Operations 3056-3060 may be repeated, on any predetermined or other periodicity, until either an adjustment is needed or one of a content interrupt or a conference interrupt is received. If "NO," indicating that an adjustment is needed, the process may return to Operation 3020. It is to be appreciated that, absent adjustment, Operations 3056-3062 may be repeated until the watch party ends, as indicated by a content interrupt. Further, it is to be appreciated that very little network 108, sync server 102 content node 106, and user device 104 processing time and computing/communications overhead is needed to maintain synchronization of user devices during a live and/or recorded watch party and in accordance with at least one embodiment of the present disclosure.

Figure 3C:
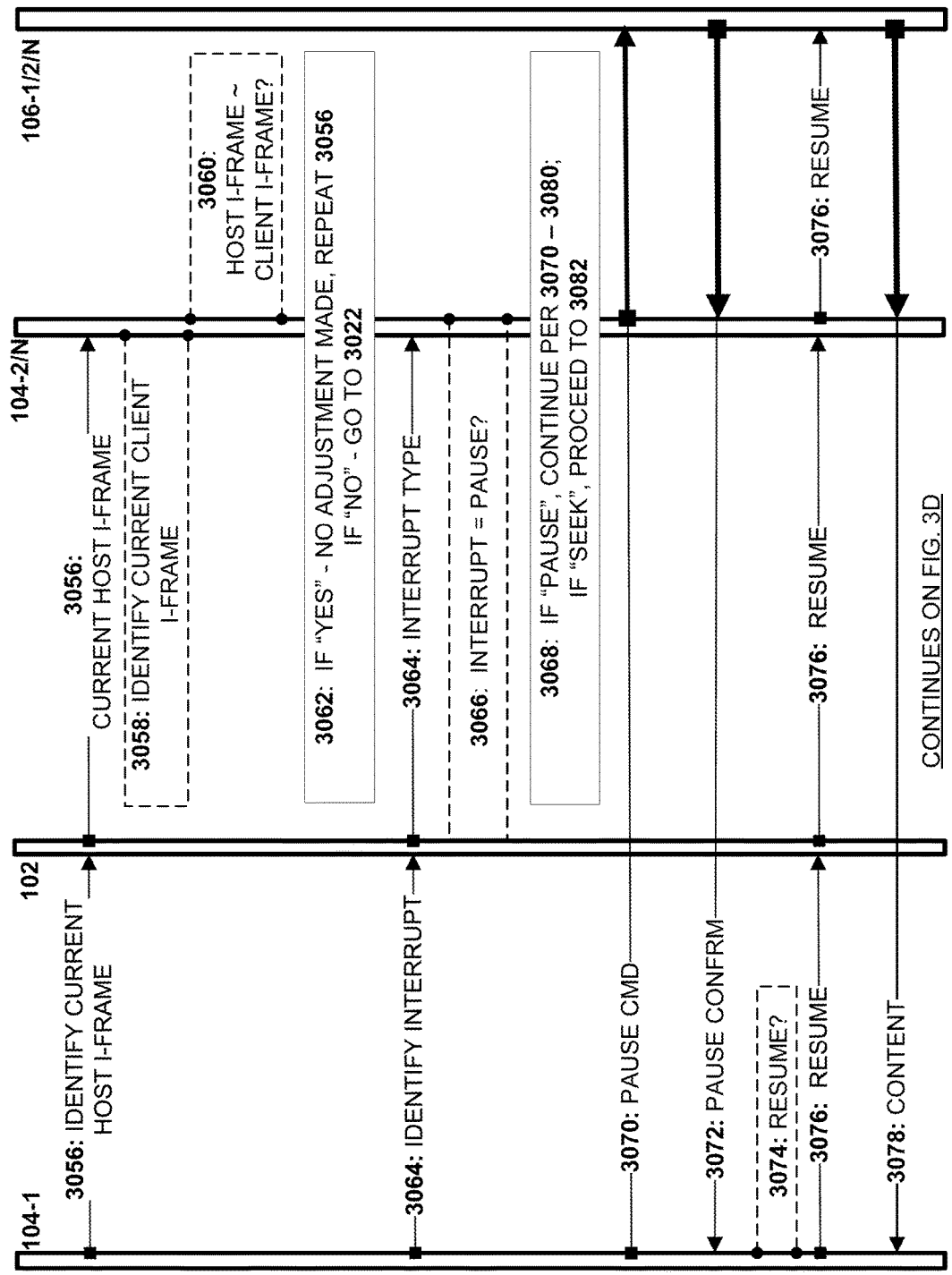
Figure 3D:
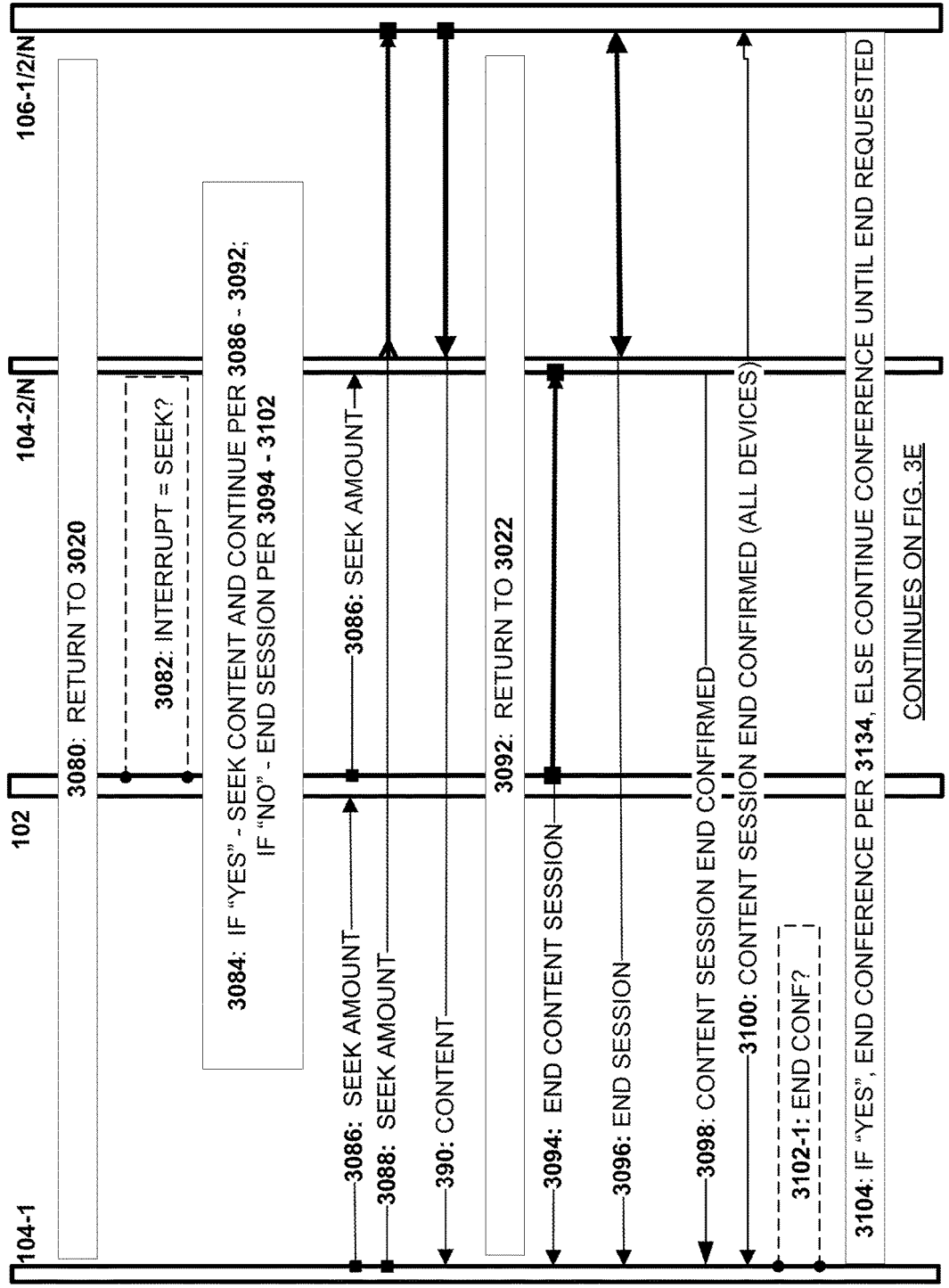

Per Operations 3064 to 3078, the process may include operations for content interrupts. As used herein, a content interrupt may occur when a host user device 104-1 and/or a permitted client user device 104-2/N requests a trick-play mode be implemented during the watch party. As shown in FIG. 3C, a process for a representative content interrupt include a pause of content presentation, as per Operations 3064-3080 or a seek for later content (including, e.g., by use of a forward or fast forward command), as per Operations 3082-3090 is shown. Similar processes may be used for other forms of content interrupts.

More specifically, per Operation 3064, the process may include determining a type of content interrupt requested. Such process may be performed on the sync server 102 and, for at least one embodiment, communicated to the respective client user devices 104-2/N, which may be also, alternatively and/or additionally configured to similarly determine the type of content interrupt requested, per Operation 3066, so that each of such client user devices 104-2/N may also provide corresponding instructions to their respective content nodes 106-2/N.

Per Operation 3068, when a pause operation is requested, the process proceeds with Operations 3070-3080. If a seek is requested, the process proceeds to Operation 3082.

Per Operation 3070, the process may include communicating a pause command by each user device 104-1/2/N to their respective content nodes 106-1/2/N. Per Operation 3072, a confirmation of the pause may be communicated by the content nodes 106-1/2/N to the respective user devices 104-1/2/N. It is to be repeated that for at least one embodiment a communication of the pause confirmation may be repeated, on any desired periodicity, and until the pause is lifted.

Per Operation 3074, a "resume" request may be received by the host user device 104-1. For at least one embodiment, resume requests may only be received from a user of the host user device 104-1. For other embodiments, resume requests may be received from users of client user devices 104-2/N for further communication to and processing by the host user device 104-1.

Per Operations 3076 and 3078, the process may include the host user device 104-1 communicating a "resume" command to each client user device 104-2/N and by each user device 104-1/2/N to their respective content nodes 106-1/2/N. For at least one embodiment, coordination of the communication of the resume commands may be provided by the sync server 102 such that, upon resumption of content presentation, synchronization of content presentation by the host user device 104-1 is maintained with the client user devices 104-2/N based upon the most recently computed delay, as per Operation 3030.

Per Operation 3080, the process may then continue with Operation 3020.

Per Operation 3082, the process may include determining whether a content interrupt is a "seek" request. A seek may be for any desired progression through the content including, but not limited, to a forward progression, such as a fast forward or skip ahead, or a backwards progression, such as a rewind or skip back.

As discussed above, and as per Operation 3084, when a seek trick-mode is requested, the process may include Operations 3086-3092. If the content interrupt is not a pause or a seek operation, then for at least one embodiment, it is determined to be an end of the watch party request. In which case, the process may continue with Operations 3094-3102.

Per Operation 3086, the process for a seek request may include determining the amount of progression requested. Again, a progression may be positive (for a forward seek) or negative (for a backward seek). The amount of progression desired may vary by user device 104-1/2/N. For at least one embodiment, the amount of progression for a given seek for a given client user device 104-2/N may be determined by the sync server 102 based on the amount of seek progression requested by the host user device 104-1. The amount of such differences in progressions, if any, may be determined, at least in part, based upon the then determined delay, as per Operation 3030.

Per Operation 3088, the determined seek amount is communicated by each user device 104-1/2/N to their respective content nodes 106-1/2/N.

Per Operation 3090, the respective content nodes 106-1/2/N then proceed to provide the content, after implementing the requested seek, to each of the respective user devices 104-1/2/N. Per Operation 3092, the process may then resume with Operation 3020.

Per Operation 3094, the process may include ending the presentation of content during a watch party by communicating a corresponding command by the host user device 104-1 and then, via the sync server 102 and by each client user device 104-2/N, to the respective content nodes 106-1/2/N. It is to be appreciated that the presentation of content during a watch party may arise before, after, or at substantially the same time as a conference portion of the watch party ends.

Per Operation 3096, the process may include each content node 106-1/2/N communicating a confirmation that the content portion of the watch party has ended. Per Operation 3098, confirmations of the content portion having ended may be communicated by the client user devices 104-2/N, via the sync server 102, to the host user device 104-1. Per Operation 3100, a message informing the content provider 105 and/or content source 107 that the content portion of the watch party may be sent by the host user device 104-1.

Per Operations 3102 and 3104, the process may include querying as to whether the conference portion of the watch party is also too end. If yes, then conference ending procedures, as per Operations 3134 to 3138 may be performed. It is to be appreciated that a content portion and/or a conference portion of a given watch party may end at any time with respect to one, multiple or all user devices.

Figure 3E:
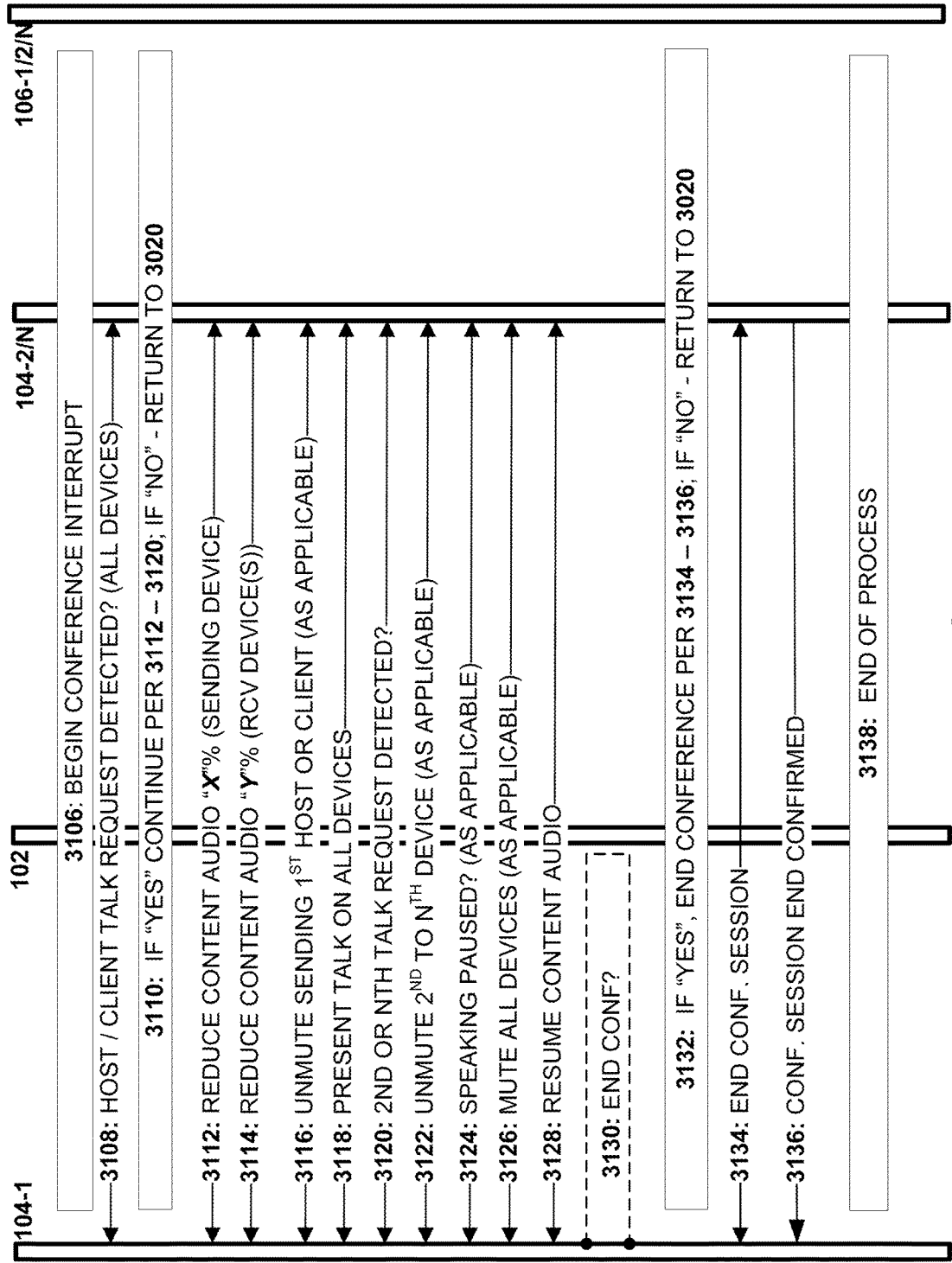

As shown in FIG. 3E, operations for processing a conference interrupt may include, for at least one embodiment of the present disclosure, Operations 3106 to 3130. As shown for this exemplary and non-limiting embodiment, the conference interrupt may include an audible interrupt, other forms of conference interrupts may be used, including but not limited to visual, text, gesture, or otherwise.

As used herein and for purposes of this non-limiting exemplary embodiment, an "audible interrupt" is a reaction by a user that includes, at least in part, an "audible component." Non-limiting examples of audible components include spoken words, grunts, cheers, horns, buzzers, clapping of hands, stomping of feet, banging of pans or the like, ringing of bells, whistles, or the like. As further used herein, an audible interrupt may arise automatically, such as by use of speech detection and/or other forms of audible detection software that includes one or more audible technologies. For at least one embodiment, audio technologies may include use of noise cancelling, noise reduction, sound reduction, and/or other audible sound processing technologies.

Per Operation 3106, the process for an "audible interrupt" begins. As discussed above and for this non-limiting exemplary embodiment, such an audible interrupt may occur using audible detection technologies.

Per Operation 3108, the process may include determining whether an audible interrupt, has been detected by one or more user devices. Such determining may include communications between the various user device conference engines 120-U and the server conference engine 120-S. A priority scheme may be used by such conferencing engines 120-U/S when multiple user device 104 substantially simultaneously detect audible interrupts. For at least one embodiment, an audible interrupt by a host user device 104-1 (herein a "host audible interrupt") may be given priority over an audible interrupt by a client user device 104-2/N (herein, a "client audible interrupt"). For at least one embodiment, only one audible interrupt may be permitted to be shared with users at any given time during a watch party. For other embodiments, multiple audible interrupts may be permitted at any given time. For at least one embodiment, the conferencing engines 120-U/S may be configured to emphasize, e.g., by volume adjustments, a host audible interrupt over a client audible interrupt.

Per Operation 3110, the process may include determining whether to proceed with a given audible interrupt. Any desired process, logic, computer instructions, or the like may be used in determining whether to proceed, at any given time, with the sharing of an audible interrupt. If "Yes", then one or more of Operations 3112-3120 may be performed. If "No", then the audible interrupt may be ignored or delayed and the process may return to Operation 3020.

Per Operation 3112, and when an audible interrupt is to proceed and one or more audible components are to be shared with watch party user devices, the process may include reducing content audio by the interrupting/sending user device by a given percentage "X %." "X" may be any desired value and may vary over time. For example and not by limitation, the reduction may initially be fifty percent (50%) and may increase up to one hundred percent (100%) over time, as desired. The amount of reduction in the content audio may be based upon pre-set reductions, host user device 104-1 user inputs, sync server 102 inputs, inputs by a user of a client user device 104-2/N providing a given audible interrupt, or otherwise.

Per Operation 3114, the process may include reducing content audio on one or more receiving devices by a given percentage "Y %." "Y" may be any desired value and may vary over time. At any given time, "Y" may or may not equal "X." At any given time, "Y" may vary be each receiving user device. "Y" may vary in view of one or more user preferences, as provided in user data 204A for a given user device 104.

Per Operation 3116, the process may include unmuting (when necessary) the sending user device such that the audible component may be captured and communicated to other watch party user devices. When multiple users are permitted to provide audible components substantially simultaneously, (un)muting of a given user device 104 may occur at any time, for any duration, and otherwise. For at least one embodiment, the (un)muting of a given user device 104 may be as directed by a host user device 104-1. For at least one embodiment, the (un)muting of a given user device 104 may be directed by the server conference engine 120-S executing one or more computer instructions. Such computer instructions may include and/or facilitate use of artificial intelligence, machine learning, or the like.

Per Operation 3118, the process may include sharing the audible components to one or more receiving user devices. For at least one embodiment, such audible components may be shared on a substantially simultaneously basis with the utterance thereof or other generation thereof by the speaking user/user device. For at least one embodiment, an audible component may be provided on a time-delayed basis, with the time delay being facilitated by one or more of the sending user's user device conference engine 120-U and/or the server conference engine 120-S. When time delayed, computer instructions may be used to filter out, cancel, or otherwise adjust components that include content that is not or may not be acceptable for presentation to one or more of the receiving users such as, but not limited to, audible interrupts including profanity, graphic language, or the like.

Per Operation 3120, the process may include use of one or more parallel and/or serial audible interrupt processes, whereby only a single user (for serial) or multiple users (for parallel) are permitted to share their audible components with other users at any given time during a watch party. Accordingly, the process may include determining whether other user devices, such as one or more client user devices 104-2/N, have indicated a desire to provide their own audible interrupts—each such indication being herein an audible interrupt request. For at least one embodiment, the server conference engine 120-S may be configured to use a prioritization scheme for audible interrupt requests. For at least one embodiment, such prioritization scheme may prioritize audible interrupt requests received from the host user device 104-1 over all other audible interrupt requests. For at least one embodiment, audible interrupt requests may be prioritized on a first-requested, first-permitted approach. For at least one embodiment, audible interrupt requests may be prioritized using any desired scheme including, but not limited to, random prioritization, round-robin prioritization, preferred user prioritization, or otherwise.

Per Operation 3122, the process may include unmuting one or more of a $2^{nd}$ to Nth user device approved to provide an audible component, herein a "second audible component." For at least one embodiment, such second audible component may be provided on a substantially simultaneously basis with the utterance or other generation thereof of the first audible component. For at least one embodiment, such second audible component may be captured and then provided to other users on a time-delayed basis, with the time delay being facilitated by one or more of the then interrupting user's user device conference engine 120-U, the server conference engine 120-S, and/or the host user devices conference engine 120-U(1). When time delayed, computer instructions may be used to filter out, cancel, or otherwise adjust second audible components that may not be acceptable for presentation to one or more receiving users, such as those including profanity, graphic language, or the like.

Per Operations 3124 and 3126, the process may include monitoring the user devices permitted to provide an audible component, such as a host audible component or a client audible component, for a pause in the providing of such audible component(s). It is to be appreciated that a given user may provide an audible component with natural speaking pauses. Accordingly and for at least one embodiment, the speaking user's user device conference engine 120-U and/or user interface 122 may be configured to detect when a natural pause has been exceeded and then, as per Operation 3126, mute the given user device. A so muted user device may then reenter a new audible interest request and enter a queue or other prioritization scheme, as provided by Operations 3106 to 3122. As further shown and per Operation 3126, at some point, all of the user devices will again be muted.

Per Operation 3128, the process may include resuming content audio on one or more, if not all, user devices participating in the watch party. It is to be appreciated that the resumption of content audio may occur incrementally, all at once, or otherwise. For at least one embodiment, content audio may be resumed at different times on different user devices, as controlled, for example, by each user devices conference engine 120-U and/or user device user interface 122.

Per Operation 3130, the process may include determining whether the conference session portion of the watch party is to end. As discussed above, the conference portion may begin, end, be paused, or otherwise interrupted, at any given time relative to a watch party, and independently or dependently with the providing of the content portion (the content session portion) of the watch party.

Per Operation 3132, if "YES" and the conference session portion is to end, the process may proceed with Operations 3134-3136. If "NO", then the process may include returning to Operation 3020.

Per Operation 3134, the process may include ending a conference session portion of a watch party. For at least one embodiment, the ending of a conference session portion may include a communication of a message by one or more of the host user device 104-1 and/or the sync server 102 to the client user devices 104-2/N.

Per Operation 3136, the process may include the host user device 104-1 receiving a confirmation from one or more of the server and/or the client user devices 104-2/N that the conference session portion of the watch party has ended with respect to one or more, if not each, of the client user devices 104-2/N. When the conference session portion has ended for all user devices, the process may end, as per Operation 3138.

It is to be appreciated that the operations described above and depicted in FIGS. 3A-3E are illustrative only and are not intended herein to occur, for all embodiments of the present disclosure, in the order shown, in sequence, or otherwise. One or more operations may be performed in parallel and operations may be not performed, as provided for any given use of an embodiment of the present disclosure.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A system, facilitating content watch parties, comprising:
   a server comprising a server CPU;
   a host user device communicatively coupled to the server;
   a client user device communicatively coupled to the server; and
   a content provider communicatively coupled to and providing a given content to the host user device and the client user device;
   wherein the server CPU instantiates a server synchronization engine which executes non-transient computer instructions which configure the server to perform synchronize operations which facilitate substantially simultaneous presentations of the given content by the host user device and the client user device;
   wherein the server CPU is operable to instantiate a server conference engine which executes non-transient computer instructions which configure the server to perform conferencing operations including:
      determining whether a conference interrupt has been received by the server;
      identifying a sending device of the conference interrupt;
      identifying a receiving device for the conference interrupt; and
      determining a conference interrupt type; and
      when the conference interrupt type is an audible interrupt, the conferencing operations further comprise:
         instructing a first reducing of a first volume setting at the sending device;
            wherein the first volume setting is for an audio portion of the given content;
         instructing a second reducing of a second volume setting at a receiving device;
         instructing an unmuting of the sending device;
            wherein upon being unmuted the sending device is operable to communicate a first audible component to the server;
         receiving the first audible component from the sending device; and
         communicating the first audible component to the receiving device;
      communicating the conference interrupt from the sending device to the receiving device to facilitate collaboration between a host user device user and a client user device user during the providing of the given content to the host user device and the client user device.

2. The system of claim 1,
wherein the first reducing and the second reducing respectively reduce the first volume setting by a first percentage (X %) and by a second percentage (Y %).

3. The system of claim 2,
wherein the first percentage (X %) differs from the second percentage (Y %).

4. The system of claim 1,
wherein the given content comprises live content.

5. The system of claim 1,
wherein the sending device is one of the host user device and the client user device and the receiving device is the other of the host user device and the client user device.

6. The system of claim 1,
wherein the conferencing operations further comprise:
   receiving a second audible interrupt request to provide a second audible component; and
   outputting one of the first audible component and a second audible component.

7. The system of claim 6,
wherein the conferencing operations further comprise:

prioritizing one of the first audible interrupt request and the second audible interrupt request; and
based on the prioritization, outputting one of the first audible component and the second audible component.

8. A system, facilitating content watch parties, comprising:
a server comprising a server CPU;
a host user device communicatively coupled to the server;
a client user device communicatively coupled to the server; and
a content provider communicatively coupled to and providing a given content to the host user device and the client user device;
wherein the content provider is operable to first provide a first portion of the given content independently to the host user device and the client user device;
wherein the content provider is further operable to independently second provide a second portion of the given content to the host user device and the client user device; and
wherein the first providing of the first portion of the given content occurs separately of the second providing of the second portion of the given content;
wherein the server CPU instantiates a server synchronization engine which executes non-transient computer instructions which configure the server to perform synchronize operations which facilitate substantially simultaneous providing by the content provider and presentation of the given content by the host user device and the client user device; and
wherein the server CPU is operable to instantiate a server conference engine which executes non-transient computer instructions which configure the server to perform conferencing operations including:
determining whether a conference interrupt has been received by the server;
identifying a sending device of the conference interrupt;
identifying a receiving device for the conference interrupt; and
communicating the conference interrupt from the sending device to the receiving device to facilitate collaboration between a first user of the host user device and a second user of the client user device during the providing of the given content to the host user device and the client user device.

9. The system of claim 8,
wherein the conference interrupt type is at least one of an audible interrupt, a visual interrupt, a text interrupt, and a gesture interrupt.

10. The system of claim 8,
wherein the client user device includes an internal output device; and
wherein the conference input is presented by the client user device using the internal output device.

11. The system of claim 10, further comprising:
a ten-foot device communicatively coupled to the client user device; and
wherein the given content is presented by the client user device using the ten-foot device.

12. The system of claim 8,
wherein the content provider further comprises a content distribution network including a host content node and a client content node;
wherein the host user device is communicatively coupled to the host content node; and
wherein the client user device is communicatively coupled to one of the client content node.

13. The system of claim 8,
wherein the synchronization operations further include:
determining when a first portion of the given content is first received, at a first time, by the host user device;
determining when the first portion of the given content is second received, at a second time, by the client user device;
determining a first delay between the first time and the second time;
setting, based on the first delay, a first delay interval adjustment; and
adjusting by the client user device and based on the first delay interval adjustment, a client user device presentation of the given content; and
wherein the adjusting facilitates substantially simultaneous presentation of another portion of the given content by the client user device and the host user device.

14. The system of claim 13,
wherein the delay is between 100 milliseconds and 1000 milliseconds.

15. The system of claim 14,
wherein the synchronization operations further comprise:
determining whether a current delay exceeds the first delay;
when the current delay exceeds the first delay:
setting a second delay interval adjustment; and
second adjusting by the client user device and based on the second delay interval adjustment, a client user device presentation of the given content; and
when the current delay does not exceed the first delay:
periodically determining whether a current portion of the given content is being presented substantially simultaneously by the host user device and the client user device.

16. A server comprising:
a server CPU; and
a server data store storing first non-transient computer instructions which, when executed by the server CPU, instantiate a server sync engine and second non-transient computer instructions, which when executed by the server CPU, instantiate a server conference engine;
wherein the server sync engine, when instantiated, configures the server to perform synchronize operations which facilitate substantially simultaneous providing by the content provider and presentation of a given content by a host user device and a client user device; and
wherein the server conference engine, when instantiated, configures the server to perform conferencing operations comprising:
determining whether a conference interrupt has been received by the server;
determining a type of the conference interrupt;
wherein, when the type of the conference interrupt received by the server is a first audible interrupt the conferencing operations further comprise:
identifying a sending device of the first audible interrupt;
identifying a receiving device for the first audible interrupt;
wherein the sending device is one of the host user device and the client user device and the receiving device is the other of the host user device and the client user device, the conferencing operations further comprise:

instructing a first reduction in a first volume setting at the sending device;

wherein the first volume setting is for an audio portion of the given content;

instructing a second reduction in a second volume setting at a receiving device;

instructing an unmuting of the sending device; wherein upon being unmuted, the sending device is operable to communicate a first audible component to the server;

receiving the first audible component from the sending device; and facilitating, during a providing of a given content to the host user device and the client user device, collaboration between a first user of the host user device and a second user of the client user device by communicating the first audible component to the receiving device.

17. The server of claim 16,
wherein the conferencing operations further comprise:
determining whether a second audible interrupt request has been received to provide a second audible component; and if a second audible interrupt request has been received, prioritizing the first audible interrupt request and the second audible interrupt request; and based on a determined priority, computing one of the first audible component and the second audible component to the receiving device.

18. The server of claim 17,
wherein a first providing of a first portion of the given content by a content source occurs separately of a second providing of a second portion of the given content by the content source; and wherein the synchronization operations further comprise:
synchronizing the second providing of the second portion of the given content by the content source to the client user device to facilitate substantially simultaneously presentations of the second portion of the given content by the host user device and the client user device.

\* \* \* \* \*